Aug. 9, 1960  H. C. LEHDE  2,948,371
COMBINED MAGNETIC CLUTCH AND BRAKE MECHANISM
Filed Oct. 28, 1958  7 Sheets-Sheet 2

INVENTOR.
HENRY LEHDE
BY Reuben J. Carlson
ATTORNEY

Aug. 9, 1960   H. C. LEHDE   2,948,371
COMBINED MAGNETIC CLUTCH AND BRAKE MECHANISM
Filed Oct. 28, 1958   7 Sheets-Sheet 3

INVENTOR.
HENRY LEHDE
BY *Reuben J. Carlson*
ATTORNEY

Aug. 9, 1960 H. C. LEHDE 2,948,371
COMBINED MAGNETIC CLUTCH AND BRAKE MECHANISM
Filed Oct. 28, 1958 7 Sheets-Sheet 5

INVENTOR.
HENRY LEHDE
BY Reuben J. Carlson
ATTORNEY

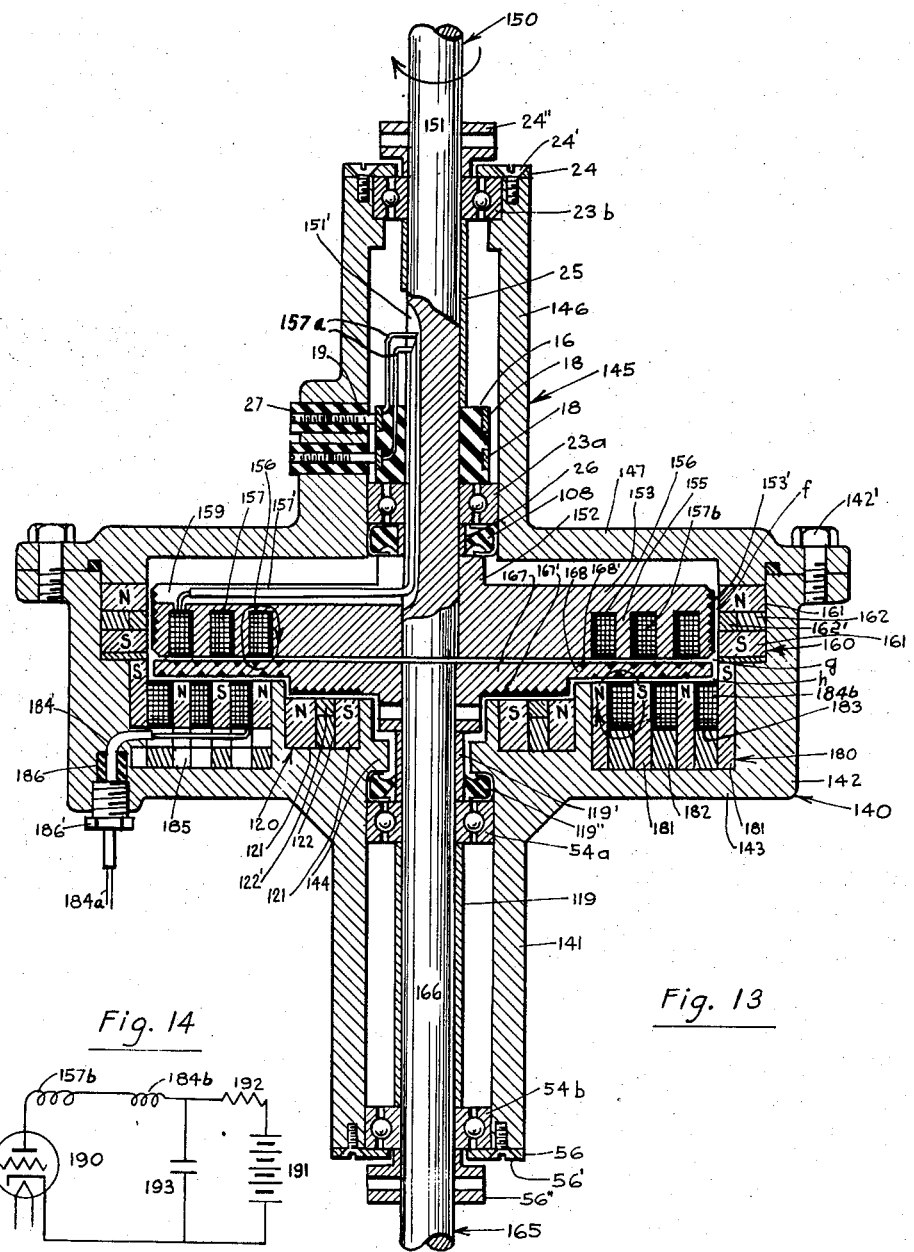

United States Patent Office 2,948,371
Patented Aug. 9, 1960

2,948,371

COMBINED MAGNETIC CLUTCH AND BRAKE MECHANISM

Henry C. Lehde, P.O. Box 212, Northport, N.Y.

Filed Oct. 28, 1958, Ser. No. 770,148

20 Claims. (Cl. 192—12)

This invention relates to a combined magnetic clutch and brake mechanism, and particularly to an electrically controlled clutch and brake mechanism in which magnetic fluid or powder is employed to produce alternating clutching and braking action.

The general organization and design of this mechanism is such that the clutching and braking action is effected in an extremely short interval of time. Because of this significant characteristic, this mechanism is particularly applicable to installations where a very rapid driving acceleration and deceleration is required.

Another important feature of this invention resides in the unique construction and arrangement of the clutching and braking components whereby full acceleration or deceleration is not only obtained in a small fragment of a second of time, but which is highly efficient in both clutching and braking action, is relatively simple in construction and inexpensive to manufacture, highly compact in organization and can be designed for either high power or minimal power applications.

The combined magnetic clutch and brake mechanisms of this invention are so designed that the clutching and braking actions do not interfere with one another, although exerted on the same rotor driven member, which may be in the form of a drag cup or drag disc as desired. This improved mechanism is smooth and fool-proof in operation, and capable of indefinitely absorbing load shocks without serious wear or damage. The mechanism of this invention further incorporates means for eliminating the normal troublesome effects of settling and packing of the magnetic particles due to gravity and centrifugal force.

Other objects and advantages of this invention will become apparent in the course of the following description.

Although the characteristic features of this invention will be particularly pointed out in the claims, the invention itself, and the manner in which it may be carried out, may be better understood by referring to the following description taken in connection with the accompanying drawings forming a part hereof in which:

Fig. 13 is a longitudinal section of a further modified form of disc-type magnetic clutch and brake mechanism which does not circulate the magnetic fluid or powder and in which the brake action is supplied by permanent magnets; and Fig. 14 is a wiring diagram of the electrical circuits for the disc-type magnetic clutch and brake mechanism shown in Fig. 13.

Similar reference characters refer to similar parts throughout the several figures of the drawings and the specification.

Figures 1, 2:
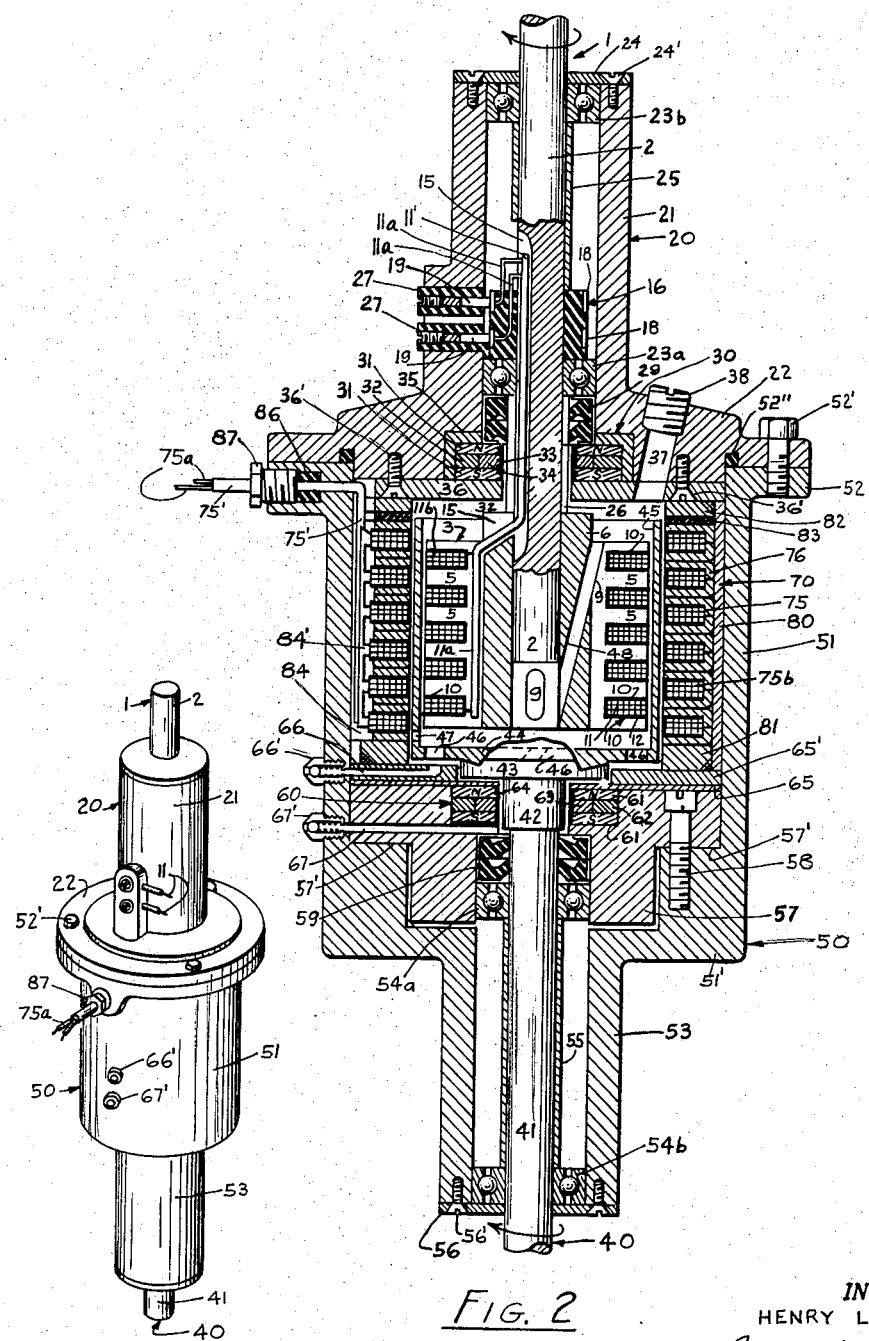
Fig. 1 is a perspective view of one form of magnetic clutch and brake mechanism of this invention.
Fig. 2 is a longitudinal section of the magnetic clutch and brake mechanism shown in Fig. 1.

The magnetic clutch and brake mechanism as illustrated in Figs. 1 to 10 inclusive includes a rotor assembly 1 whose magnetic windings are energized to drive a drag cup assembly 40. The rotor assembly 1 generally comprises an externally driven rotor shaft 2 fixed to a magnetic rotor core 3 which supports a series of spaced wire round bobbins 10 inset into appropriate spaced grooves extending circumferentially around the core. The rotor shaft 2 of the externally driven rotor assembly 1 is journaled in spaced ball bearing assemblies 23a and 23b contained in the tubular shaft enclosing section 21 of a rotor shaft housing 20. The shaft housing 20 also contains resilient sealing rings 29 adjacent the bearing 23a from which magnetic particles are excluded by a toroidal magnet assembly 30 which extends around the rotor shaft 2 adjacent the rotor core 3. The structure and function of the toroidal magnet assembly 30 is disclosed in my copending application Serial No. 726,807.

Figure 6:
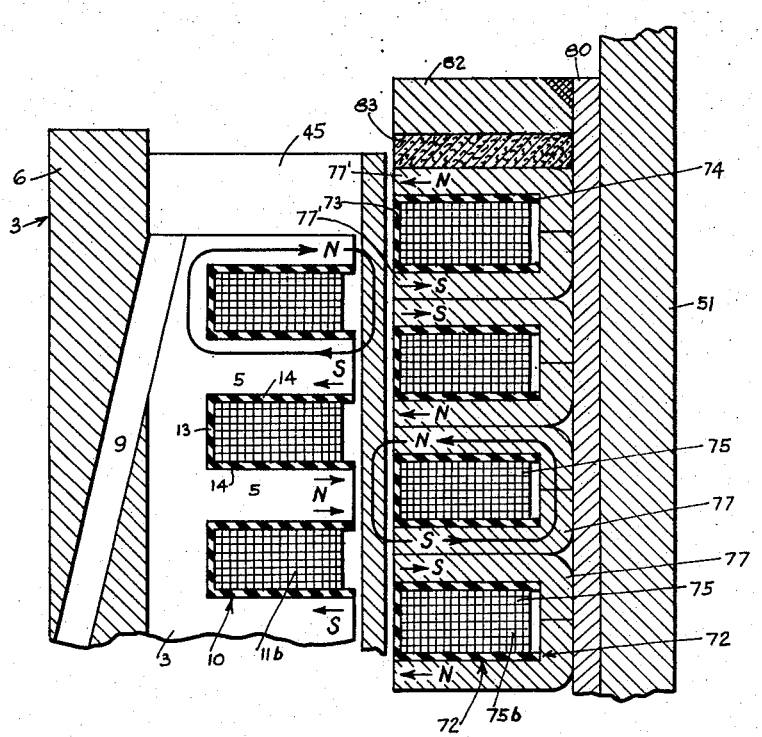
Fig. 6 is an enlarged fragmentary longitudinal section of the rotor assembly, drag cup assembly and braking assembly, this view illustrating the magnetic circuits which are established through the poles of the rotor assembly, brake assembly and drag-cup positioned therebetween when the magnetic coils of the rotor assembly and brake assembly are alternatively energized.

The drag cup assembly 40 presents a drag cup shaft 41 having a drag cup affixed to the end thereof which presents a cylindrical wall 45 in telescopic relation to the rotor core 3 and its associated wire wound bobbins 10 as shown in Figs. 2 and 6. The cylindrical wall 45 of the drag cup is enclosed within the cylindrical body section 51 of a main housing 50, the body section 51 having a flange 52 which is secured as by bolts 52' to the head section 22 of the rotor shaft housing 20. The drag cup shaft 41 is rotatably supported by spaced ball bearing assemblies 54a and 54b pocketed within the shaft enclosing section 53 of the main housing 50 as shown in Fig. 2. The cylindrical body section 51 of the main housing 50 contains a ring shaped bottom block 57 formed of non-magnetic material and which has an axial bore which contains one of the roller bearing assemblies 54a and the adjacent resilient oil seal 59 which is in surrounding relation to the drag cup shaft 41. The non-magnetic bottom block 57 also presents a cavity in which a toroidal magnet assembly 60 is pocketed which operates to exclude magnetic particles from contact with the oil seal 59.

Figure 5:
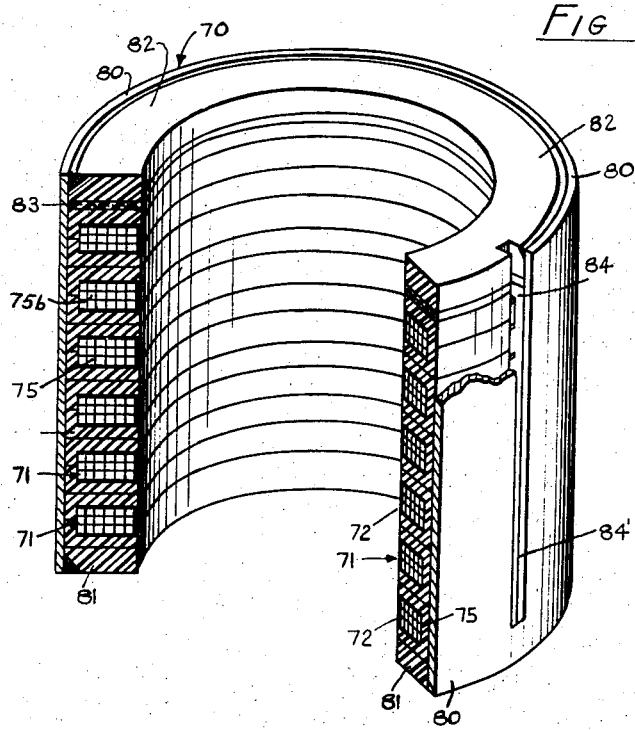
Fig. 5 is a perspective view partly in section of the magnetic brake assembly which telescopes over the drag-cup and is designed when energized to exert substantially instantaneous braking action on the drag-cup.

The cylindrical body section 51 of the main housing 50 also contains a magnetic brake assembly 70 of generally cylindrical form as shown in Fig. 5 and which is telescoped between the cylindrical wall 45 of the drag cup and the cylindrical body section 51 of the main housing 50, as shown in Fig. 2. The magnetic brake assembly may be composed of a series of wire wound bobbins 72 sandwiched between dish-shaped magnetic metal rings 76 or 78 which provide the pole pieces for the electromagnetic units of the brake assembly.

Figure 10:
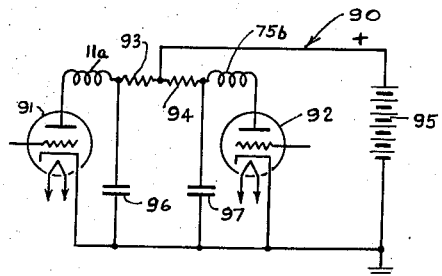
Fig. 10 is a wiring diagram of the electrical circuit employed in alternatively energizing the magnetic windings of the rotor assembly and brake assembly.

The winding terminals of the rotor assembly and the brake assembly are coupled to a control circuit supplied with direct current. The control circuit as illustrated in Fig. 10 includes resistors, condensers, and thyratrons which operate to supply peak voltage and coupling torque to the rotor assembly and drag cup assembly 40 the moment the rotor is switched into operation. The control circuit also operates to provide peak voltage to the magnetic brake assembly 70 and the consequent application of peak braking force to the rotating drag cup assembly 40 the moment that the rotating rotor assembly is de-energized.

The various parts and assemblies which compose this clutch and brake mechanism will now be described in further detail.

*The magnetic rotor assembly*

Figure 3:
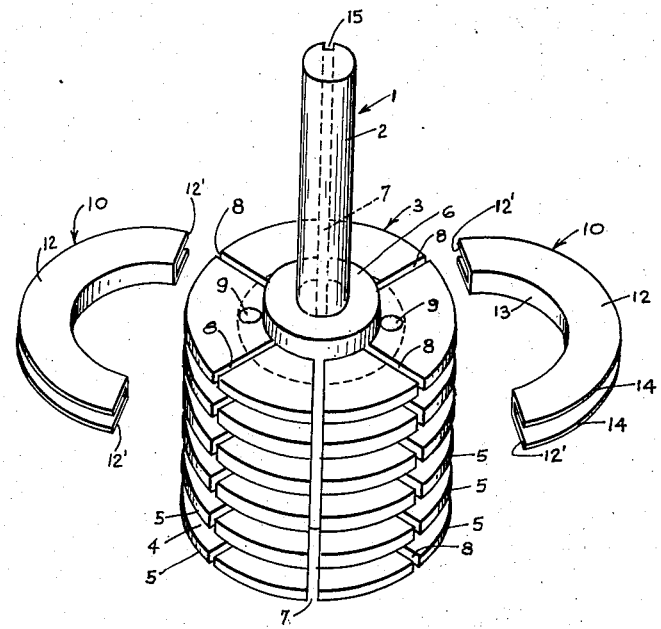
Fig. 3 is a perspective view of the shaft and core section of the rotor assembly which constitutes the driving part of the clutch, two semi-circular half sections of one of the winding spools being shown exploded from the core section to illustrate the procedure employed in assembling the winding spools on the core section.
Figure 9:
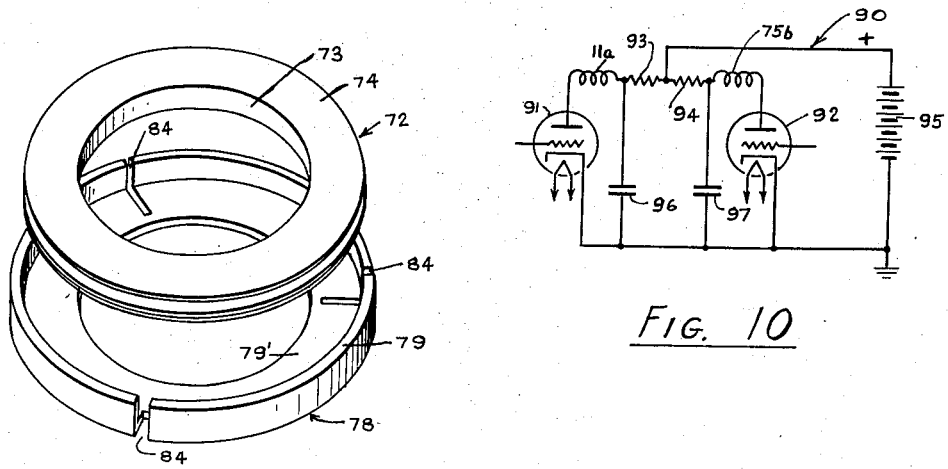
Fig. 9 is an exploded perspective view of the wire supporting bobbin and one of the disc-shaped pole rings shown in section in Fig. 8, and which together provide one of the alternative forms of electromagnetic units of the brake assembly.

The magnetic rotor assembly as shown more particularly in Figs. 2 and 3 comprises rotor shaft 2 which is driven by an external source of applied power and is preferably made from strong shafting metal such as steel preferably having magnetic properties. The inner end of the shaft 2 is rigidly connected to a magnetic rotor core 3. The rotor core 3 is generally cylindrical in form and presents a plurality of spaced grooves 4 which extend circumferentially around the core body, the grooves 4 defining space pole segments 5 which are integral with the hub section 6 of the core. The rotor shaft 2 may be formed as an integral part of the core 3, but for convenience in manufacture, the rotor core 3 is preferably provided with an axial bore into which the end of the rotor shaft 2 is driven and rigidly fixed.

The rotor core 3 as shown in Fig. 3 may be formed from a cylindrical block of magnetic metal in which the circumferential spaced grooves 4 are cut, to thereby define the spaced pole segments 5. A pair of diametrically opposite and longitudinally extending major slots 7 as shown in Figure 3 are cut into the body of the rotor core and extend radially from the outer circumference of the rotor core to the solid hub section 6 thereof. The major slots 7 are of sufficient width to conveniently receive the winding wires as threaded therethrough, and in addition provide an accessible space for sealing the abutting ends 12' of the semi-circular spool sections 12 as paired together and inserted within the circumferential grooves 4. In addition to the major radial slots 7, a series of radially extending minor slots 8 are cut in the rotor core as shown in Fig. 3 and which may have the same depth as the major radial slots 7. The minor radial slots 8 as well as the major radial slots 7 serve to reduce or substantially eliminate objectionable eddy current effects when the spaced pole segments 5 are magnetized.

The complementary spool half sections 12 as seated within the respective circumferential grooves 4 of the rotor core form a series of stacked spools on which a predetermined number of turns of magnet wire 11 are wound. The magnet wire 11 is preferably formed of highly conductive metal such as copper, coated with a flexible non-conductive sheathing, and generally referred to as enameled magnet wire. Each spool is preferably formed from a tough and non-conductive plastic such as nylon or the like, and each spool is cast in the form of two half-sections 12 as shown in Fig. 3, which when joined together at their meeting ends, provide a continuous ring or spool having a U-shaped cross section and presenting an inner bottom wall 13 and a pair of spaced side walls 14 extending outwardly therefrom.

Before winding the rotor core, a pair of mated spool sections 12 are inserted radially into each of the circumferential grooves 4 formed in the rotor core, and are so arranged that the butting ends of the half sections are in alignment with the diametrically opposed major slots 7 cut in the rotor core. The spool half sections 12 are so formed and dimensioned as to snugly and tightly fit within the circumferential grooves 4 into which they are inserted. A continuous length of magnet wire 11 is first wound in a predetermined number of turns on the first spool which is adjacent the projecting end of the rotor shaft 2, the wire is then threaded through one of the major radial slots 7 and thence wound in a reverse direction on the next adjacent spool. The winding operation is continued until all spools have been wound with the desired number of wire turns, with alternate spools wound in the same direction and the intermediate spools wound in the opposite direction, to thereby establish alternating polarity in the adjacent ring pole segments 5. After the last spool has been wound, the lead wire therefrom may be threaded longitudinally through one of the major radial slots 7 along the hub section 6 of the rotor core 3.

The input and output ends of the magnet wire 11 extending respectively from the lowermost and topmost spools are enclosed within a sheathing 11' to protect the wires from damage, and these sheathed wires are then run through a wire-receiving slot 15 formed in the hub section 6 of the rotor and the rotor shaft 2 as shown in Fig. 2. After winding, the major and minor slots 7 and 8 in the rotor core 3, as well as the wire slots 15 are filled with a sealing plastic or varnish which also serves to seal the abutting ends of the spool half-sections 12 together.

A slip ring assembly 16 embraces the shaft 2 and may be composed of an insulating collar as shown in Fig. 2 which snugly embraces the shaft 2 and which supports a pair of circumferentially extending input and output slip rings 18 which rotate with the shaft 2 and to which the input and output wires 11a are connected. The slip rings 18 rotate in contact with laterally projecting contact brushes 19 supported by the shaft housing 20 and to which current is supplied. The stationary shaft housing 20 is provided with a pair of insulating bushings 27 in which the slip ring brushes 19 are fitted. Wiring terminals are fitted within the bushings 27 and connect the brushes 19 to the control circuit hereafter described.

The rotor shaft 2 is enclosed within a shaft housing 20 which presents a tubular section 21 terminating in a flange or head section 22 by means of which the shaft housing may be connected to the main housing 50 of the mechanism above described. The bearing assembly 23b which is adjacent the terminal end of the shaft enclosing section 21 may be protected by a closure plate 24 which is affixed to the adjacent end of the tubular housing section 21 as by screws 24'. A primary spacer sleeve 25 snugly telescopes over the rotor shaft 2 and is positioned between the bearing assembly 23b and the insulating collar of the slip ring assembly 16 to maintain these parts in proper spaced relation. The companion bearing assembly 23a is positioned directly adjacent the opposite end of the insulating collar of the slip ring assembly 16 and is maintained in this position by a secondary spacer sleeve 26 which extends between the bearing assembly 23a and the hub section 6 of the rotor core. The secondary spacer sleeve 26 is fixed to rotate with the shaft 2 and is formed of magnetic metal. A double oil seal 29 preferably formed of a pair of resilient ring shaped sealing gaskets is positioned directly adjacent the bearing assembly 23a and seals the space between the secondary sleeve 26 and the adjacent interior surface of the housing section 21.

To prevent the movement of magnetic particles from the main housing 50 into contact with the bearing seal 29, a toroidal magnet assembly 30 is mounted within a conforming recess provided formed in the head section 22 of the shaft housing 20. This toroidal magnet assembly 30 comprises a pair of spaced pole rings or washers 31 of highly magnetic material having an outer permanent ring magnet 32 and an inner spacer ring 33 of non-magnetic material sandwiched therebetween. The inner cylindrical surfaces of the spaced pole rings 31 and spacer ring 33 are substantially in alignment and are provided with helical ribs or screw threads 34 whose valleys are preferably filled with non-magnetic plastic so as to leave the crowns of the helical ribs exposed. The helical ribs 34 are positioned closely adjacent the secondary spacer sleeve 26 which is fixed to the shaft and formed of magnetic material. The outer side faces of the pole rings 31 as well as the outer periphery of the ring magnet 32 are encased within a non-magnetic shell 35 preferably formed of suitable moulding plastic. The pole rings 31 and the ring magnet 32 are thus isolated from the surrounding metal forming a part of the shaft housing 20 so that the magnetic lines of force emanating from the permanent ring magnet 32 are confined to the pole rings 31 and the adjacent portion of the secondary spacer sleeve 26 as shown in Fig. 2. The helical rib 34 is so turned that when the rotor shaft 2 is rotated in its normal direction, the stray magnetic particles which have entered into the space between the secondary sleeve 26 and the threads 34 are driven back into the main housing 50.

A non-magnetic retainer plate 36 may be applied to the outside face of the head section 22 of the rotor shaft housing 20 and secured thereto as by spaced screws 36' to thereby retain the toroidal magnet assembly 30 in assembled position within the rotor shaft housing as shown in Fig. 2. To supply or replenish magnetic fluid, or a component of the magnetic fluid mixture to the brake and clutch mechanism, a fluid injection hole 37 may extend through the head section 22 of the rotor shaft housing and the retainer plate 36 and the hole closed by a screw plug 38. The entire rotor assembly 1 and its rotor shaft housing 20 may be assembled as a separate unit for subsequent attachment to the main housing 50.

*The drag cup assembly*

Figure 4:
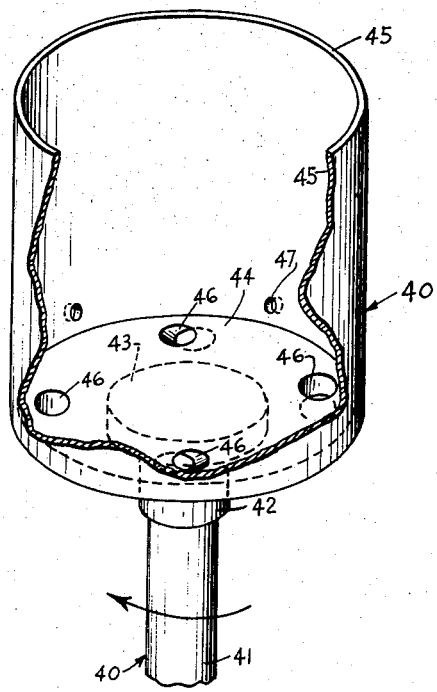
Fig. 4 is a perspective view of the drag-cup assembly constituting the driven part of the clutch, certain parts being broken away to illustrate structural details.

The drag cup assembly 40 as shown in Figs. 2 and 4 comprises a drag cup shaft 41 having an enlarged neck section 42 terminating in a disc-shaped head section 43 which may be integrally formed of suitable shafting metal, or these parts may be separately formed and rigidly joined together, with at least the neck section 42 formed of magnetic material. The drag cup presents a bottom wall 44 rigidly fixed to the shaft head section 43 and presents a cylindrical wall 45 formed integral with the bottom wall 44 and extending therefrom, the bottom wall 44 and cylindrical wall 45 being formed of magnetic metal. A plurality of inclined impeller holes 46 extend through the bottom wall 44 of the drag cup adjacent to the cylindrical wall 45 thereof, and operate to pump magnetic fluid from the exterior into the interior of the drag cup. A series of spaced bleeder holes 47 extend through the cylindrical wall 45 of the drag cup adjacent the bottom end thereof for the circulation of magnetic fluid.

The drag cup assembly 40 is contained within the main housing 50 which presents a cylindrical body section 51 in surrounding relation to the cylindrical wall 45 of the drag cup. The cylindrical body section 51 terminates in a rim flange 52 which is secured as by bolts 52' to the head section 22 of the rotor shaft housing 20. A resilient sealing gasket 52" set within a conforming cavity provided in the outside face of the head section 22 provides a liquid tight seal between the head section 22 and the cylindrical body section 51 of the main housing 50.

The cylindrical body section 51 terminates in a bottom wall portion 51' which merges into a tubular shaft enclosing section 53 of reduced diameter. The drag cup shaft 41 is rotatably supported by a pair of spaced ball bearing assemblies 54a and 54b with one of the ball bearing assemblies 54b supported by and positioned adjacent the terminal end of the shaft enclosing section 53 and protected by an end closure plate 56 secured to the terminal end of the shaft enclosing section 53 as by screws 56'. The bearing assemblies 54a and 54b are maintained in spaced relationship by a spacer tube 55 which embraces that portion of the shaft which extends therebetween and may rotate therewith.

The companion bearing assembly 54a is contained within the bore of the ring shaped bottom block 57 of non-magnetic material which seats within a conforming pocket formed in the bottom wall 51' of the main housing 50. The bottom block 57 presents a circumferential shoulder 57' which snugly seats on a complementary shoulder which forms a part of the bottom wall portion 51' of the main housing 50; suitable bolts 58 being provided to secure the ring-shaped bottom block 57 to the bottom wall portion 51'. The ball bearing assembly 54a snugly seats within the bore of the bottom block 57 and is supported thereby. The bore of the bottom block 57 also contains a bearing seal 59 which may be formed by a pair of resilient sealing gaskets in surrounding relation to the drag cup shaft 41 and positioned between the bearing assembly 54a and the neck section 42 of the drag cup shaft as shown in Fig. 2.

A toroidal magnet assembly 60 designed to exclude magnetic particles from contact with the bearing seal 59 is pocketed within a conforming cavity formed in the inner face of the bottom block 57. The magnet assembly 60 comprises a pair of spaced pole rings or washers 61 of highly magnetic material, with a permanent ring magnet 62 and an inner non-magnetic spacer ring 63 sandwiched therebetween. The inner cylindrical surfaces of the spaced pole rings 61 and spacer ring 63 are substantially in alignment, are positioned directly adjacent the magnetic neck section 42 of the drag cup assembly, and are provided with a helical rib 64 whose valleys are preferably filled with non-magnetic plastic so as to leave the crowns of the helical ribs exposed. The bottom block 57 of the main housing 50 is desirably made of non-magnetic material, and the bottom block 57 is preferably capped by a non-magnetic retainer ring or plate 65 which maintains the toroidal magnet assembly 60 in fixed position as shown in Fig. 2. The pole rings 61 and the ring magnet 62 are thus isolated from the surrounding metal so that the magnetic lines of force emanating from the permanent ring magnet 62 are confined to the pole rings 61, the adjacent magnetic neck section 42 of the drag cup shaft and the intervening space therebetween. The helical rib 64 is so turned that when the drag cup shaft 42 is rotated in its normal direction, stray magnetic particles which may have entered the space between the shaft neck section 42 and the helical rib 64 are driven back into the cylindrical body section 51 of the main housing and prevented from contacting the oil seal 59.

The interior of the cylindrical body section 51 of the main housing may also be provided with a non-magnetic secondary spacer ring or plate 65' having an axial hole of sufficient diameter to receive the head section 43 of the drag cup shaft. The secondary ring 65' may be formed integrally with the primary retainer ring 65. The secondary spacer ring 65' has a radial injection passage 66 as shown in Fig. 2 which extends through the adjacent wall of the cylindrical body section 51 of the main housing and to which an injector fitting 66' may be threaded. By the application of an injection gun to the injector fitting 66', a magnetic particle component or a lubricating component may be injected into the cylindrical body section 51 of the main housing 50 adjacent the bottom wall 44 of the drag cup assembly. A second radially extending injection passage 67 may also extend through the bottom block 57 and the cylindrical wall 51 of the main housing 50 and to which a second injection fitting 67' may be threaded. By the application of an injection gun to the injection fitting 67' a selected lubricant may be injected into the space adjacent the neck section 42 of the drag cup shaft 41.

The magnetic brake assembly

Figure 7:
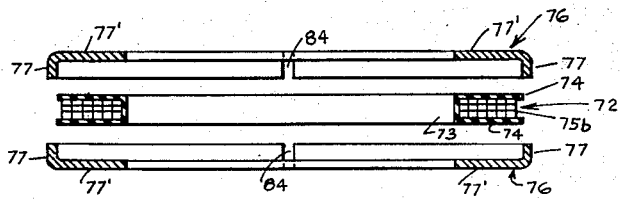
Fig. 7 is an exploded sectional view of the wire wound bobbin and associated pole pieces which together form one of the several electromagnetic units which are stacked together to form the brake assembly.
Figure 8:
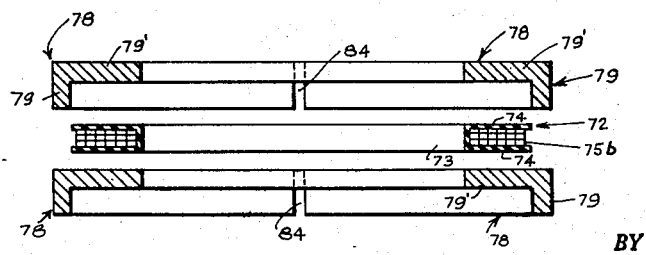
Fig. 8 is an exploded sectional view of an alternative form of electromagnetic unit which may be used in the formation of the brake assembly.

The magnetic brake assembly 70 as shown in Figs. 2 and 5 is generally tubular in form and is positioned directly adjacent the inside face of the cylindrical body section 51 of the main housing 50 and the outside face of the cylindrical wall 45 of the drag cup assembly 40 as shown in Fig. 2. The magnetic brake assembly comprises a series of stacked electromagnetic units 71 of ring shaped form each comprising a ring-shaped spool 72 of U-shaped cross section wound with enameled magnet wire 75. Each spool 72 is preferably molded from a tough insulating plastic such as nylon and presents a cylindrical bottom wall 73 with spaced side walls 74 radiating therefrom as shown in Figs. 7 and 8. The wire wound spools are sandwiched between dish-shaped rings formed of magnetic metal which provide the pole pieces for the electromagnetic units.

In one form of the invention as shown in Fig. 7, a pair of complementary dish-shaped magnetic rings 76 provide the pole pieces for each wire wound spool as shown in Fig. 7. The paired dish-shaped pole rings 76 together present rim portions 77 whose free edges are brought into abutting relation to enclose the outer periphery of the wire wound spool 72, and a pair of side wall portions 77' which snugly overlie the side walls 74 of the wire wound spool. The electromagnetic ring units as thus formed appear as shown in Fig. 5 when in stacked relation, and together provide a relatively smooth and flush interior wall.

The wire wound spools 72 may also be sandwiched between magnetic pole rings 78 of alternate form as shown in Figure 8. The alternative pole rings 78 each present a rim portion 79 and a side wall portion 79' which together define a cavity of sufficient depth to fully enclose one side and the outer rim of the wire wound spool 72, with the side wall portion 79' of the adjacent pole ring enclosing the opposite side of the wire wound spool as indicated in Figure 8. When the wire wound spools 72 and alternate pole rings 78 are stacked together in internested relation, the wire wound spools 72 are fully encased between adjacent pool rings 78.

The electromagnetic units comprising the wire wound spools 72 and paired pole rings 76 or alternate pole rings 78 are maintained in stacked relation by a stacking cylinder 80 of magnetic material which is snugly telescoped over the stacked electromagnetic units. To maintain the paired pole rings 76 or the alternate pole rings 78 in compressed contact relation, a bottom ring 81 is secured as by a weld to the lower end of the stacking cylinder 80 so that the bottom ring 81 provides a platform support for the stacked units. A top ring 82 is secured to the upper end of the stacking cylinder 80 after the electromagnetic units have been stacked in the cylinder. Where the top ring 82 is to be secured as by a weld to the cylinder 80, it is desirable to place a separator ring 83 formed of asbestos or the like between the top closure ring 82 and the adjacent elctromagnetic unit so that welding heat will not damage the insulating spools 72 on which the magnet wire is wound.

In constructing the magnetic brake assembly, the desired number of turns of the magnet wire 75 are wound on each of the spools 72. The pole rings 76 or 78 containing the wound spools 72 are then stacked in the cylinder 80 in the order shown in Figs. 2 and 5 with the terminal ends of the windings of each spool placed in the wiring slot 84 cut in the rim portion 79 of the adjacent pole ring 78, or the rim portions 77 of the adjacent pole rings 76. Soldered connections are made between the windings of adjacent spools 72, so that the current in adjacent spools will flow in opposite directions. As thus assembled and connected, the side wall portions 79' of the adjacent pole rings 78, or the side wall portions 77' of the adjacent pole rings 76 will possess the proper polarity to provide a flow of magnetic lines of force as indicated by the arrows shown in Fig. 6. For example, the adjacent abutting side wall portions 77' of adjacent electromagnetic units will possess the same polarity, while the next adjacent side wall portions 77' of the next adjacent electromagnetic units will be of opposite polarity. Magnetic lines of force will thus flow around adjacent wire wound spools 72 in opposite directions, with the magnetic lines of force bridging the gap between the inner face of the magnetic brake assembly and the adjacent cylindrical wall 45 of the drag cup, which space would contain magnetic particles during operation of the mechanism.

The terminal wire from the lowermost spool as shown in Fig. 2 is enclosed within a suitable sheathing 75' and is threaded through a longitudinal slot 84' formed in the stacking cylinder 80 as shown in Figs. 2 and 5. The lead wire from the topmost spool shown in Fig. 2 is also covered with a suitable protective sheathing 75' and the lead wire and terminal wire together run through a radial hole formed in the rim flange 52 of the main housing for connection to the control circuit. The rim flange 52 may be provided with an enlarged hole which contains a compressible packing bushing 86 which is capped by a threaded packing nut 87 through which the lead and terminal wires 75a extend.

The magnetic brake assembly 70 is so constructed as to permit economical and rapid assembly thereof as a completed unit while separate from the other parts of the mechanism, and can then be dropped into position between the outer face of the cylindrical drag cup wall 45 and the inner face of the cylindrical body section 51 of the main housing. This assembly operation is performed before the rotor shaft housing 20 is applied. As shown in Fig. 2, it will be noted that when the wire wound rotor core 3 is fully inserted into the drag cup, the electromagnetic windings applied to the rotor core are in staggered relation with respect to the windings applied to the brake assembly, so that there is substantially no magnetic flow between the poles of the rotor windings and the brake windings when alternately energized. The wiring grooves 84 and 84' are filled with non-conductive plastic or varnish when the lead and terminal wires are placed therein, and the inner faces of the spool windings as shown in Fig. 5 are also covered with non-conductive plastic.

Operation

Fig. 10 is a diagrammatic illustration of a pulsing circuit 90 which may be used to insure high voltage pulses to the clutch coils 11b and brake coils 75b. The clutch coil winding 11b and the brake coil winding 75b are respectively connected to the plates of power vacuum tubes 91 and 92 and also to the resistors 93 and 94, which are supplied with a high positive voltage from a battery 95. Condensers 96 and 97 are connected to the negative side of battery 95 and to the clutch and brake coils 11b and 75b. Both condensers 96 and 97 will be charged to full battery voltage when no current is flowing in the resistors to which they are connected. When a positive control voltage is applied to the grid of tube 91, current will flow from the plate to the cathode of tube 91. At the instant conduction begins in tube 91, the effective value of the applied voltage causing current flow in coil 11b will be the voltage to which condenser 96 has been charged, or full battery voltage. After the condenser 96 is partly discharged, current will flow in resistor 93, and the applied voltage will decrease because of the voltage drop across resistor 93. The full battery voltage is thus applied initially to quickly establish control current in clutch coil 11b, after which resistor 93 will control the steady state current.

Current through the brake coil 75b is established in the same manner by tube 92, condenser 97 and resistor 94. It is evident that tubes 91 and 92 should be operated under so-called cut-off conditions, where the tube is either completely conducting or completely non-conducting. The tubes employed may be thyratrons, ignitrons or high vacuum tubes, but thyratrons and ignitrons have the advantage of being inherently on-off devices.

The preferred magnetic fluid mixture employed in this clutch and brake mechanism is composed of carbonyl iron powder, molybdenum disulfide and silicone oil, though other magnetic fluid materials may be used. In packing the mechanism with magnetic fluid, a lubricating grease such as silicone grease is first injected as by means of an injection gun connected to the fitting 67' through the passage 67 until the lubricant emerges through the impeller holes 46 in the bottom wall 44 of the drag cup assembly 40. The magnetic fluid, such as a mixture of carbonyl iron powder and molybdenum disulfide and silicone oil is injected as by means of an injection gun attached to the fittings 66', the magnetic fluid flowing through the passage 66 until the body of the main housing is substantially filled, and the magnetic fluid is visible in the passage 37. The magnetic fluid or silicone oil or a mixture thereof may be replenished from time to time as required by injecting additional magnetic fluid and/or silicone oil through the filler hole 37.

During operation, the magnetic fluid is maintained in constant agitation by the pumping effect exerted by the inclined impeller holes 46 formed in the bottom wall 44 of the drag cup assembly, and the pumping effect exerted by the upwardly inclined passages 9 formed in the hub section 6 of the rotor assembly 1. Since the rotor assembly is constantly rotating, the magnetic fluid is thereby pumped through the gap between the outer surface of the cylindrical wall 45 of the drag cup assembly and the inner surface of the brake assembly 70 during rotation of the drag cup. When the drag cup is not rotating, magnetic fluid is pumped through the upwardly inclined passages 9 of the rotating rotor 3 and through the gap between rotor core 3 and the inner surface of the cylindrical wall 45. The gaps between the cylindrical wall 45, the outer surface of the rotor core 3, and the inner surface of the magnetic brake assembly 70, are filled with magnetic fluid at all times. The usual packing difficulty of the iron powder in working gaps is prevented by the agitated circulation of the magnetic fluid, the sudden starting and stopping of the drag cup, and the scouring effect of the magnetic fluid in the working gaps during operation.

It is desirable to provide a working gap between the inner face of the cylindrical wall 45 of the drag cup assembly and the outer surface of the rotor core 3 in the order of fifteen thousandths of an inch, and to provide a like small dimensioned working gap between the outer face of the cylindrical wall 45 of the drag cup and the inner surface of the brake assembly 70. The thickness of the cylindrical wall 45 of the drag cup should also be approximately one-half the thickness of a pole ring 5 of the rotor and the thickness of the adjacent pole rings 76 or pole ring 78 of the brake assembly. By staggering the wire wound spools 10 of the rotor core 3 with respect to the wire wound spools 72 of the brake assembly 70, magnetic lines of force are prevented from traveling into the gap at the outside face of the drag cup wall 45 when the rotor coils 11b are energized, or into the gap at the inside face of the drag cup wall 45 when the brake coils 75b are energized.

Actual tests have demonstrated that a clutch and brake mechanism constructed as above described and having drag cup wall 45 which is three inches in diameter and three inches deep, will provide a clutching and an alternate braking force equal to ten foot pounds, and that full torque is reached for either clutching or braking in about $\frac{1}{100}$ of a second.

Disc-type magnetic clutch and brake mechanism

Figure 11:
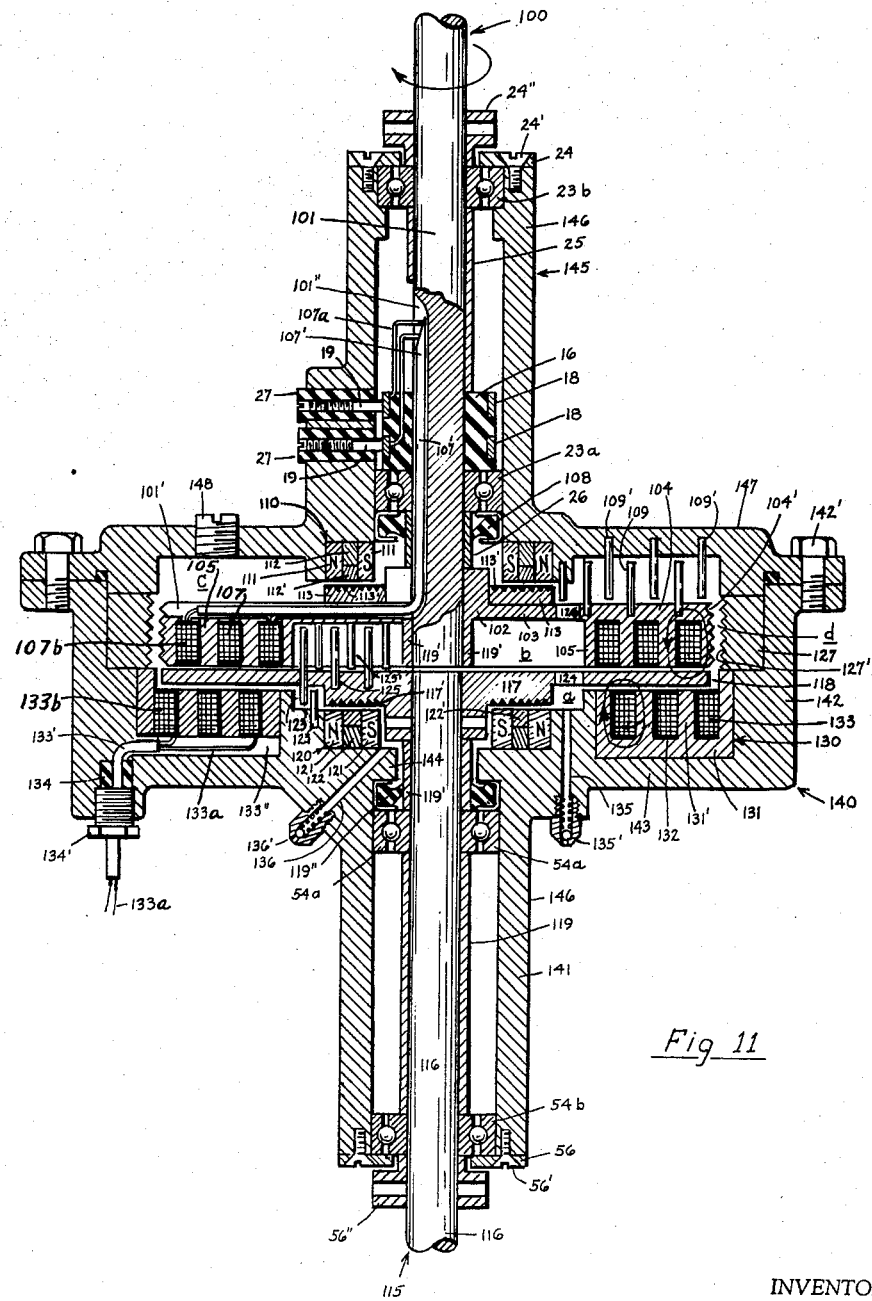
Fig. 11 is a longitudinal section of a modified form of magnetic clutch and brake mechanism whose driven part is in the form of a drag disc and which provides for circulation of magnetic fluid around the disc.
Figure 12:
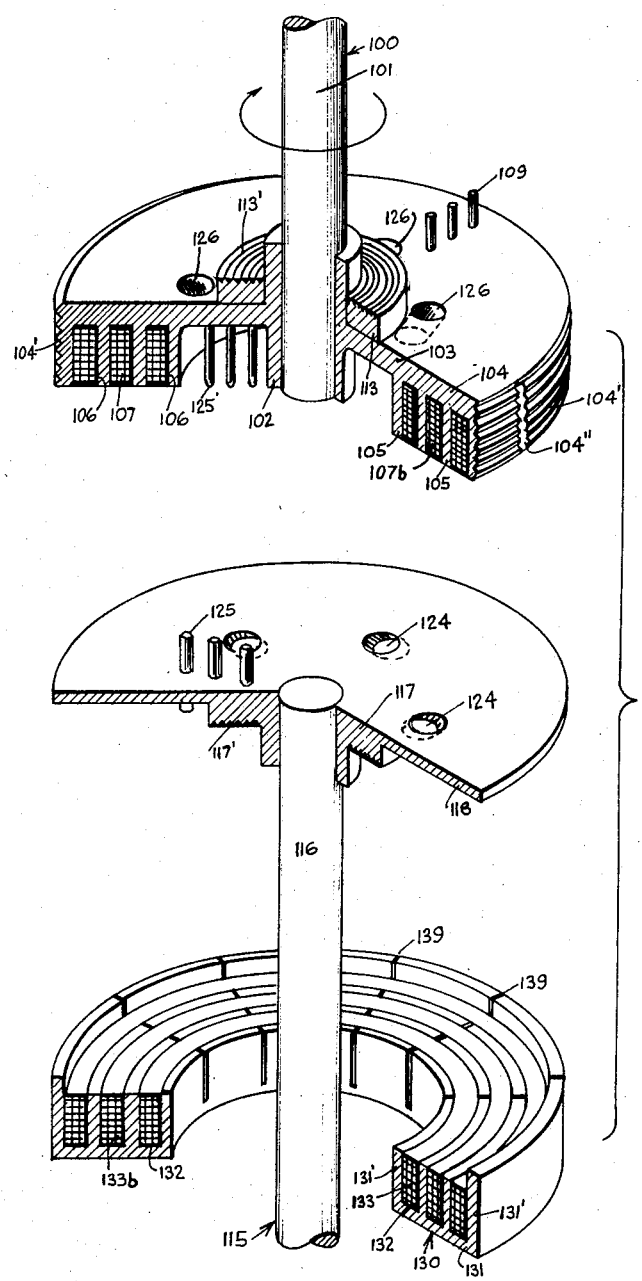
Fig. 12 is an exploded sectional view showing the working relationship between the clutch rotor assembly, clutch disc assembly and brake assembly of Fig. 11.

There is shown in Figs. 11 and 12 a disc-type magnetic clutch and brake mechanism, which has the advantage of occupying minimum space and which possesses a high degree of clutching and braking power which can be alternately applied substantially instantaneously. This disc-type magnetic clutch and brake mechanism comprises a disc-type rotor assembly 100 operating in conjunction with a disc-type clutch assembly 115 and a disc-type braking assembly 130 contained within a main housing 140 and a cover housing 145.

The disc-type rotor assembly 100 comprises a rotor shaft 101 formed of a suitable shafting metal which may or may not be magnetic, and which is fixed to the hub section 102 of a driving rotor disc which is formed of magnetic material. The driving rotor disc presents a relatively thin inner disc section 103 and an outer rim section 104 whose thickness may be greater than the thickness of the inner disc section 102. The thickened outer rim section 104 has spaced and circumferential extending grooves formed therein as shown in Figs. 11 and 12 which are defined by spaced circumferentially extending partitions 105 defining the pole rings for a series of wire wound spools of increasing diameter, each of the wire wound spools being formed by a ring-shaped spool casing 106 which is U-shaped in cross-section and is formed of non-magnetic material such as nylon or similar tough plastic. Enamel coated magnet wire 107 is wound on each of the spool casings 106 with the adjacent spool casings wound in opposite directions and with the required number of turns to establish the desired magnetic field. When the winding coil wire 107 is energized, lines of magnetic flux will circulate through the pole forming partitions 105 as indicated in Fig. 11. The lead and terminal wires 107a from the spool windings are contained in an insulating covering 107' which extends through an appropriate radial groove 101' formed in the rotor disc and a corresponding longitudinal groove 101'' formed in the rotor shaft 101.

The rotor shaft 101 is supported by the tubular section 146 of a cover housing 145 and which contains a pair of bearing assemblies 23a and 23b which supports the shaft 101. The cover housing 145 also presents a dish-shaped head section 147 which may be secured as by bolts 142' to the cylindrical body section 142 of a main housing 140 into which the driving rotor disc telescopes. A closure plate 24 is secured to the end of the shaft receiving section 146 of the housing cover 145 as by screws 24' and a suitable collar 24'' may be secured to the projecting end of the shaft 101 to maintain the shaft 101 and its associated rotor disc in properly fixed position within the cylindrical body wall 142 of the main housing 140.

The lead and terminal wires 107a are connected to a slip ring assembly 16 contained within the tubular section 146 of the cover housing and comprises a non-conducting collar made from hard rubber or the like secured to the shaft 101, and which supports a pair of slip rings 18 to which the lead and terminal wires 107a are connected. A pair of contact brushes 19 supported by insulating bushings 27 pocketed in apertures in the wall of the tubular shaft containing section 146 of the housing cover are maintained in riding contact with the slip rings 18. The control circuit wires are connected by suitable adapters to the slip ring brushes 19.

A primary spacer sleeve 25 extends between the bearing assembly 23b and the rubber body and slip ring assembly 16 and a secondary spacer sleeve 26 surrounding the shaft 101 and positioned between the bearing assembly 23a and the hub section 102 of the driving rotor disc serves to maintain the bearing assemblies 23a and 23b and the slip ring assembly 16 in proper spaced relation. The bearing assembly 23a is further protected by a resilient sealing gasket 108.

The space between the inner face of the head section 147 of the housing cover 145 and the adjacent driving disc provides a gap c which contains the magnetic fluid. The fluid in this gap may be maintained in proper agitated condition by a series of spaced pins 109 which are fixed to the rim section 104 of the rotor disc and by a series of spaced and cooperating pins 109' projecting downwardly from the inside face of the head section 147 of the cover housing 145, as shown in Figs. 11 and 12.

Magnetic fluid is prevented from contacting the bearing seal 108 by a toroidal magnet assembly 110 maintained within a suitable pocket formed in the inside face of the head section 147 of the cover housing as shown in Fig. 11. This magnet assembly may be ring shaped in form, comprising a pair of pole rings 111 between which a permanent magnet ring 112 and a non-magnetic spacer ring 112' are sandwiched. The cover housing 145 may be made of non-magnetic material, but if the material is magnetic, the permanent magnet assembly 110 may be suitably shielded therefrom by non-magnetic material. A side face of the toroidal magnet assembly 110 is positioned adjacent a ring plate 113 of magnetic material which is supported by the adjacent face of the inner disc section 103 of the driving rotor disc. The magnetic plate 113 has a spiral rib 113' formed therein whose valleys are filled with a non-magnetic plastic so that the ridge peak only of the spiral is exposed. The spiral rib 113' is so formed as to eject magnetic particles entering the gap between the toroidal magnet 110 and the spiral rib 113' into the gap space c where the agitating pins 109 and 109' are located.

A disc-type clutch assembly 115 is positioned to magnetically interlock with the driver rotor assembly 100, as shown in Figs. 11 and 12. The disc-type clutch assembly 115 comprises a clutch shaft 116, the inner end of which is fixed to a driven disc formed of magnetic material and presenting a thickened hub section 117 and an outer disc section 118 positioned in adjacent relation to the winding coils set within the thickened outer rim section 104 of the rotor assembly 100. The driven disc of the clutch assembly 115 is also contained within the cylindrical body section 142 of the main housing, and its shaft 116 is contained within and supported by the tubular shaft receiving section 141 of the main housing.

The clutch shaft 116 is rotatably supported within the tubular shaft containing section 141 of the main housing by means of a pair of spaced ball bearing assemblies 54a and 54b which are maintained in separated position by a primary spacer tube 119. A secondary spacer tube 119' is positioned between the bearing assembly 54a and the hub section 117 of the clutch assembly which serves to maintain the bearing assembly 54a in proper spaced relation with respect thereto. The outer end of the shaft containing section 141 of the main housing is closed by an end-closing plate 56 which maintains the adjacent bearing assembly 54b in position, the plate 56 being secured to the tubular section 141 as by screws 56'. A suitable collar 56" fixed to the shaft 116 maintains the clutch shaft and its driven disc in proper fixed relation so that appropriate gap b for magnetic fluid is maintained between the outer clutch disc section 118 and the coil supporting rim section 104 of the rotor assembly.

A resilient sealing gasket 119" pocketed within the main housing 140 and positioned adjacent to the bearing assembly 54a prevents leakage of lubricant from the bearing assembly. Magnetic particles contained within the gaps of the mechanism is prevented from contacting the seal 119" by a toroidal magnet assembly 120 presenting a pair of spaced pole rings 121 between which a permanent ring magnet 122 and a non-magnetic spacer ring 122' are sandwiched. Where the main housing 140 is made of non-magnetic material, further non-magnetic sheathing around the toroidal magnet 120 is not required, but if the housing 140 is made of magnetic material, the adjacent faces of the toroidal magnet are encased by non-magnetic material. The adjacent underface of the hub section 117 is provided with a spiral rib 117' whose valley is filled with non-magnetic material so that only the peak ridge thereof is exposed. The spiral rib 117' is so formed as to drive magnetic particles entering the space between the hub section 17 and the toroidal magnet assembly 120 in an outward direction and into the gap space a during normal rotation of the clutch assembly to thereby prevent the magnetic particles from contacting the bearing seal 119".

A toroidal shaped magnetic brake assembly 130 is positioned directly below the outer disc section 118 of the clutch assembly and seats on the bottom wall 143 of the main housing 140 in a circumferential pocket defined between the cylindrical body section 142 and the hub section 144 of the main housing. The magnetic brake assembly comprises and is formed from a doughnut shaped ring 131 of magnetic metal having a series of spaced circular grooves formed therein defining pole forming partitions 131' and in which the magnetic wire wound spools 132 are pocketed. Each concentric spool 132 is U-shaped in cross-section and supports an appropriate number of turns of insulated magnet wire 133, the successive spools being of progressively increasing diameter as indicated in Figs. 11 and 12. The wire 133 is wound in opposite directions on adjacent spools to establish a flow of magnetic flux through the pole-forming partitions 131' of the brake assembly 130 and adjacent outer disc section 118 of the clutch assembly 115 as indicated in Fig. 11.

The lead and terminal wires 133a from the spool winding are pocketed in a radial groove 133" formed in the underface of the core ring 131 of the brake assembly and the lead and terminal wires, encased within the wire sheathing 133' extends through an outlet port formed in the cylindrical body section 142 of the main housing and which port contains an insulating bushing 134 which is closed by a terminal plug 134'. The lead and terminal wires emerging from the plug fitting 134' are connected to the braking control circuit which may be similar to that shown in Fig. 10.

It will be noted that the brake winding spools 132 are arranged in staggered relation with respect to the rotor winding spools 106 set within the thickened rim section 104 of the rotor assembly 100, so that the magnetic flux generated by the energized rotor winding spools 106 and circuited through the outer disc section 118 of the clutch assembly do not penetrate the magnetic core 131 of the brake assembly, and so that the magnetic lines of flux generated by the energized windings of the braking spools 132 are also confined to the outer disc section 118 of the clutch assembly and do not penetrate the outer rim section 104 of the rotor assembly.

The hub section 144 of the main housing has a passage 136 extending therethrough whose outer end is equipped with a suitable fitting 136' to which a grease gun may be applied for the injection of a suitable lubricant such as silicone grease into the gap adjacent the secondary spacing sleeve 119' of the clutch assembly. A second passage 135 also extends through the hub section 144 of the main housing in which a magnetic fluid such as a mixture of carbonyl iron, molybdenum disulfide and oil may be injected into the gap a between the inner face of the hub section 144 of the main housing and the outer disc section 118 of the clutch assembly. The outer end of the passage 135 is equipped with a suitable fitting 135' to which an injection gun can be applied. Sufficient lubricant and magnetic fluid are initially injected to fill all gaps of the mechanism, which quantity may be determined by providing an inspection port in the head section 147 of the cover housing which is normally closed by a plug 148. This inspection port can also be used for the replenishment of magnetic fluid during operation as required.

The mixture of magnetic fluid with lubricant fills the gap space a between the inner face of the main housing hub section 144 and the gap between the under face of the outer disc section 118 of the clutch assembly and the inner face of the brake assembly 130. Cooperating agitator pin 123 and 123' fixed to the inner face of the hub section 143 of the main housing and the outer face of the outer disc section 118 of the clutch assembly and projecting into the gap space a therebetween, prevents packing of the magnetic iron particles in this area. To further insure agitation of the magnetic mixture, a series of inclined impeller holes 124 extend through the outer disc section 118 and adjacent the hub section 117 of the clutch assembly. The magnetic mixture is driven from the gap space a by the impeller holes 124 and into the gap space b between the driven disc of the clutch assembly 115 and the driver disc of the rotor assembly 100. The magnetic mixture in the gap space b is maintained under constant agitation by a series of cooperating agitator pins 125 and 125' fixed to the disc of the clutch assembly 115 and the disc of the rotor assembly 100.

The inner disc section 103 of the rotor assembly 100 is also equipped with inclined impeller holes 126 through which the magnetic mixture is impelled during operation from the gap space b into the gap space c defined between the inside face of the head section 147 of the cover housing 145 and the adjacent face of the outer rim section 104 of the rotor assembly, and the magnetic mixture in the space c being further agitated by the cooperating agitating pins 109 and 109'. The agitated magnetic mixture driven from the gap c migrates into the gap d defined between the outer rim edge of the rim section 104 of the rotor assembly 100 and the adjacent inside face of the cylindrical body section 142 of the main housing 140, and which face may be formed by a non-magnetic ring 127 set into the cylindrical wall 142 of the main housing. The inner face of the ring 127 presents a spiral rib 127', and a corresponding spiral rib 104' of opposite turn may be formed in the rim face of the rim section 104 of the rotor assembly. The spiral ribs or threads 104' and 127' operate to positively drive the magnetic fluid mixture through the gap d and through the space between gap spaces b and a along the adjacent outer and inner faces of the disc section 118 of the clutch assembly. Complete and positive circulation of the magnetic fluid mixture through all the operating gaps of the mechanism is thus assured.

To reduce eddy current effects, a series of narrow radially extending slots 104" may be cut through the pole forming partitions 105 of the rotor assembly 100. These slots 104" are then filled with a plastic or varnish. Plastic or varnish is also used to bond the winding spools 106 within the circumferential spool receiving grooves in the rim section 104 of the rotor assembly, and to fill the radial grooves 101' of the rotor disc and the longitudinal groove 101" in the rotor shaft 101 to provide a protective seal for the wiring 107. Similar narrow radially extending slots 139 as shown in Fig. 12 may be cut through the pole forming partitions 131' of the brake assembly 130 to reduce eddy currents. These slots 139 are subsequently filled with a plastic or varnish which is also used to bond the winding spools 132 within the concentric grooves of the brake assembly and the lead and terminal wires 133a in the radial grooves 133" of the brake block.

In manufacture, the rotor assembly 100, clutch assembly 115, brake assembly 130, main housing 140 and cover housing 145 may be formed as completed units before these parts are integrated together to provide the completed mechanism. The fully formed brake assembly 130 is dropped into the circumferential pocket of the main housing 140 as defined between the hub section 144 and the cylindrical body section 142 thereof. The lead and terminal wires 133a contained in the wire sheathing 133' are then drawn through the wire receiving port of the main housing 140 and the insulating plug 134 and closure cap 134' applied. The shaft 116 of the clutch assembly 115 may then be inserted into the shaft receiving section 141 of the main housing 140. The secondary spacer sleeve 119', the sealing gasket 119", the bearing assembly 54a, the primary spacer sleeve 119 and the bearing assembly 54b may then be consecutively inserted into the shaft containing section 141 of the main housing, the bearing assembly 54b being locked in position by the cover plate 56 and collar 56". The rotor assembly 100 can then be applied with the rotor disc thereof positioned adjacent to the disc of the clutch assembly 115. The cover housing 145 is then applied and bolted in place and wiring connections made.

The control circuit for the disc-type magnetic clutch and brake mechanism illustrated in Figs. 11 and 12 may be similar to the circuit shown in Fig. 10 and previously described as applicable to the cup type magnetic clutch and brake mechanism shown in Figs. 1 to 9 inclusive, and wherein the rotor windings 107b would replace the rotor winding 11b of Fig. 10, and the brake winding 133b would replace the brake winding 75b of Fig. 10. The mechanism shown in Figs. 11 and 12 has the advantage of occupying minimum space, possesses high clutching and braking power, and full torque can be reached in about 1/100 of a second. The magnetic clutch and brake mechanism shown in Figs. 11 and 12 can be made miniature in size, and therefore adapted for use in electronic and computer apparatus where substantially instantaneous clutching and braking action is a prerequisite.

*Modified disc-type magnetic clutch and brake mechanism*

Fig. 13 shows a disc-type magnetic clutch and brake mechanism which is similar to the disc-type magnetic clutch and brake mechanism shown in Fig. 11 except that the magnetic brake assembly 180 of Fig. 13 is equipped with permanent magnets which normally maintain the clutch assembly 165 in braking action, except when the permanent magnets are neutralized by current applied to the coils of the brake assembly which permits the energized and positively driven rotor assembly 150 to drive the clutch assembly 165.

The rotor assembly 150 of the brake and clutch mechanism shown in Fig. 13 presents a rotor shaft 151 one end of which is fixed to the hub section 152 of relatively thick disc section 153 formed of magnetic metal and having circular concentric grooves in the face thereof defining pole forming partitions 155 therebetween. A plurality of concentric winding spools 156 whose U-shaped casings are formed of insulating material such as nylon plastic, each carrying the desired number of turns of magnet wire 157, with the windings on adjacent spools applied in opposite directions to establish a flow of magnetic flux through the pole forming partitions 155 of the rotor assembly as indicated in Fig. 13.

The shaft 151 of the rotor assembly is contained within the shaft receiving section 146 of a cover housing 145 which may be similar to the cover housing 145 previously described in connection with the mechanism shown in Fig. 11. The shaft receiving section 146 contains a pair of spaced bearing assemblies 23a and 23b which rotatably support the shaft 151 therein, the outer bearing assembly 23b being held in place by a closure plate 24 secured to the section 146 by screws 24' and shaft collar 24". A slip ring assembly 16, similar to that previously described, and presenting an insulating collar fixed to the shaft 151, is contained within the shaft receiving section 146 of the housing cover 145. The slip ring assembly 16 presents a pair of circular current conducting rings 18 to which the lead and terminal wires 157a are secured. A pair of contact brushes 19, supported within insulating bushings 27 extending through the wall of the shaft receiving section 146 of the housing cover, have their inner ends positioned to make current conducting contact with the adjacent slip rings 18. A primary spacer sleeve 25 embracing a section of the shaft 121 maintains the bearing assembly 23b and the slip ring assembly 16 in proper spaced relation. The second bearing assembly 23a is positioned to abut against the slip ring assembly 16, the bearing assembly 23a being protected by a resilient sealing gasket 108. The bearing assembly 23a is maintained in spaced relation from the hub section 152 of the rotor assembly by a secondary spacer sleeve 26.

The lead and terminal wires 157a from the winding spools 156 extend through a radial groove 159 formed in the top side of the disc section 153 of the rotor assembly, and thence extends through a longitudinal groove 151' in the rotor shaft. The lead and terminal wires 157a are encased within an insulating covering 157' and sealed within the radial groove 159 and longitudinal groove 151' by a sealing plastic or varnish. The winding spools 156 are similarly sealed in the circular grooves of the disc section 153 by sealing plastic or varnish.

To prevent abrasive magnetic particles from reaching the resilient sealing gasket 108, the rim face of the rotor disc section 153 is surrounded by a toroidal magnet assembly 160 which comprises a pair of spaced pole rings 161 of magnetic metal between which a permanent magnet ring 162 and a spacer ring 162' are sandwiched. The rim face of the rotor disc 153 has a spiral rib or screw thread 153' cut therein, whose valley is filled with a non-magnetic plastic so that only the peak ridge of the rib is exposed. The spiral rib 153' is so directed that any abrasive particles attempting to enter the gap $f$ defined between the spiral rib 153' and the permanent magnet assembly 160 are ejected away from the sealing gasket 108.

The disc section 153 of the rotor assembly 150 is contained within the cylindrical body section 142 of a main housing 140 which is made of non-magnetic material and which may be made similar to the main housing 140 associated with the brake and clutch mechanism shown in Fig. 11 as previously described. The cylindrical body section 142 is secured by bolts 142' to the head section 147 of the cover housing 145. The main housing 140 also presents a bottom wall 143 and an internal hub section 144 which joins the tubular shaft receiving section 141 thereof.

The disc-type clutch assembly 165 of the brake and clutch mechanism shown in Fig. 13 may be similar to the disc and clutch assembly 115 of the mechanism shown in Fig. 11 and previously described. The clutch assembly 165 presents a clutch shaft 166, one end of which is fixed to the hub section 167 of an outer disc section 168. The outer disc section 168 is positioned closely adjacent the underface of the disc section 153 of the rotor assembly 150 so as to present a limited gap space $g$ therebetween. When the wire coil windings 157b of the rotor winding spools 156 are energized, magnetic flux will flow into the magnetic outer disc section 168 of the clutch assembly 165, the gap $g$ then being bridged by the magnetized iron powder maintained in the gap $g$ by the action of the spiral rib 153'.

The clutch shaft 166 is supported within the tubular shaft receiving section 141 of the main housing 140 by a pair of spaced bearing assemblies 54a and 54b which are maintained in proper spaced relationship by a primary spacer sleeve 119. The bearing assembly 54b is held in position by the closure plate 56 secured by screws 56' to the shaft receiving section 141 of the housing, and the shaft and its clutching disc 168 maintained in proper operative position by a collar 56", fixed to the projecting end of the clutch shaft 166. The inner bearing assembly 54a is maintained in proper spaced relation to the hub section 167 of the clutch assembly by secondary spacer sleeve 119' and the bearing assembly 54a is protected by a resilient sealing gasket 119" in the same manner as the mechanism illustrated in Fig. 11.

Magnetic fluid containing abrasive iron powder is prevented from reaching the sealing gasket 119" by a toroidal magnet assembly 120 which is pocketed within a corresponding groove formed in the inner face of the hub section 167 of the clutch assembly. The permanent magnet assembly 120, similar to the magnet assembly 120 incorporated into the mechanism shown in Fig. 11 and previously described, comprises a pair of spaced pole rings 121 between which a parmanent magnet ring 122 and a non-magnetic spacer ring 122' are sandwiched. The adjacent under face of the hub section 167 of the clutch assembly 165 is provided with a spiral rib 167' whose valley is filled with non-magnetic plastic so that only the peak ridge thereof is exposed. The spiral rib 167' is so shaped as to drive magnetic particles entering the gap $h$ between the magnet assembly 120 and the spiral rib 167' in an outwardly direction and away from the sealing gasket 119".

A brake assembly 180 is supported by the bottom wall 143 of the main housing 140 and is pocketed between the cylindrical body section 142 and the hub section 144 thereof as shown in Fig. 13. This brake assembly is composed of a series of spaced and concentrically arranged pole rings 181 formed of magnetic material between which permanent magnet rings 182 are sandwiched. The permanent magnet rings 182 are approximately one-half the height of the adjacent pole rings 181 as shown in Fig. 13. The other half of the space between the pole rings contains winding spools 183 whose casings are of ring shaped form and U-shaped in cross section, and are preferably formed of insulating plastic such as nylon. Enameled magnet wire 184 is wound on the successive spools 183 in alternate directions and the lead and terminal ends thereof extend through a radial hole 185 in the brake assembly block, and are contained within a suitable insulating sheath 184'. The lead and terminal wires 184a pass through an insulating bushing 186 and closure plug 186' set into a convenient port formed in the cylindrical body wall of the main housing 140. The wire receiving hole 185 may be filled with suitable insulating plastic or varnish which may also be used to seal the brake assembly block in pocketed position within the body section 141 of the main housing.

The permanent ring magnets 182 establish a flow of magnetic flux through the adjacent pole rings 181 which jumps the gap $h$ between the brake assembly 180 and the underside of the disc section 168 of the clutch assembly, and circulates through the disc section 168. This flow of magnetic flux is facilitated by the magnetic fluid contained in the gap $h$. Thus the permanent magnet rings 182 and the brake assembly 180 normally operate to apply a braking force on the disc section 168 of the clutch assembly 165 so that the clutch assembly is normally immovable. However, when the brake coil windings 184b as supported by the braking spools 183 are energized, the clutch locking effect of the permanent magnet rings 182 is neutralized in a manner to demagnetize the magnetic powder within the gap $h$. A circuit control system is provided to supply current to the brake windings 184b to thereby demagnetize the magnetic particles in the gap $h$, when the rotor windings 157b are energized. Energization of the rotor windings 157b magnetizes the iron particles in the gap $g$ so that the driving rotor assembly 150 will grip and rotate the disc section 168 of the clutch assembly 165 and drive the clutch substantially without locking interference between the clutch disc section 168 and the brake assembly 180.

The magnetic clutch and brake mechanism illustrated in Fig. 13 is particularly adapted to operate with a dry magnetic powder mixture, such as a mixture of powdered carbonyl iron and molybdenum disulfide. The magnetic mixture can be poured into the main housing 140 after the cover housing 145 has been assembled thereto through a suitable filler port (not shown) in the cylindrical body section 142 of the main housing. A quantity of magnetic powder sufficient only to fill the gap spaces g and h adjacent the inner and outer faces of the outer disc section 168 of the clutch assembly 165 is required.

The inner and outer faces of the clutch disc 168 are each provided with an inwardly spiraling groove 168' which serves to maintain the magnetic powder in the gaps g and h against the action of centrifugal force. Any magnetic powder which reaches the outer periphery of the clutch disc section 168 and enters the gap f, is driven back by the spiral rib 153' into the gaps g and h adjacent the inner and outer faces of the clutch disc section 168.

Fig. 14 illustrates an electrical circuit which may be used to control the flow of current to the rotor coils 157b and the brake coils 184b. In this circuit the rotor coils 157b and the brake coils 184b are connected in series to the plate of a power vacuum tube 190. Control current is supplied from a direct current source, such as a battery 191, through a resistance element 192. A condenser 193 shunts the battery 191 and the resistance element 192 and is charged to full battery voltage when no current is flowing through the resistance element 192. When a high positive signal voltage is applied to the grid of the tube 190, conduction takes place in the tube, and current flows through the rotor coils 157b and the brake coils 184b. The initial value of this current is established by the voltage to which the condenser 193 has been charged, namely, full battery voltage. After current begins to flow, the voltage drop across the resistance element 192 will lower the effective voltage applied to the rotor and brake coils 157b and 184b. Thus a high initial current surge is applied to the rotor and brake coils 157b and 184b to instantaneously establish control current, after which the voltage drops to a lower value. As previously indicated, the brake coils 184b serve to neutralize the effect of the permanent magnets 182 of the brake assembly 180, so that the brake assembly 180 releases the clutch disc section 168 when the rotor coils 157b are energized to rotate the clutch assembly 165.

The modified disc-type magnetic clutch and brake mechanism illustrated in Fig. 13 finds particular application where it is desired to retain the clutch assembly in locked position when the mechanism is not operating. This feature may be of importance as a safety measure or for other reasons. The mechanism shown in Fig. 13 is highly compact and can be designed in any desired size for substantial power or minimal power. This mechanism finds particular uses as a clutching and braking medium for electronic and scientific instruments used in processing systems and computer apparatus.

All of the magnetic clutch and brake mechanisms of this invention as above described are highly compact and may be limited in over-all exterior dimensions in accordance with the power input and output for which the mechanism is designed. The clutching and braking assemblies are also so designed that clutching and braking actions can be effected in a minimum time and usually in a small fraction of a second. These high-speed clutching and braking actions are in part effected by making the clutch assembly relatively light, with low moment of inertia, as compared to the driver rotor assembly. The rotor assembly shaft of these mechanisms are designed to be positively driven from an outside power source, and the rotor assembly shaft may form a part of the prime mover, such as a driving motor. When the rotor assembly shaft is so joined, the rotor, clutch and brake assemblies and the containing housing may be incorporated into one end of the driving motor, and the motor bearings used to support the shaft section of the rotor assembly.

The rotor assembly core or discs of these mechanisms possess a substantially higher moment of inertia than the clutch assemblies associated therewith. For example, the core 3 of the rotor assembly shown in Fig. 2 and the core or disc 102—103—104 of the rotor assembly 100, shown in Figs. 11 and 12; and the core or disc 152—153 of the rotor assembly 150 shown in Fig. 13; may all be made of sufficient weight to serve as a balancing fly wheel for these respective rotor assemblies 1, 100 and 150, the weight thereof being substantially augmented by the electromagnet winding spools and associated pole elements which form a part thereof. The low moment of inertia possessed by the respective clutch assemblies 40, 115 and 165 is achieved by making the peripheral clutching wall thereof relatively thin and light in weight; as indicated by the cylindrical clutching wall 45 of the drag cup assembly 40 shown in Fig. 2, the outer disc section 118 of the clutch assembly 115 shown in Fig. 11, and the outer disc section 168 of the clutch assembly 165 shown in Fig. 13.

However, it will be noted that the clutching walls or sections 45, 118 and 168 present a considerable clutching area and that the rotor magnet spools and brake magnet spools directly adjacent the opposite faces thereof extend over substantially the entire effective clutching area of these clutch walls or clutch sections. The flowable magnetizable material positioned in the relatively narrow clutching gaps adjacent the opposite faces of these clutch walls or sections, operates over substantially the entire effective and usable clutching areas of these clutch walls and discs so that maximum clutching action and braking action is attained.

The use of a substantial number of rotor magnet coils and brake magnet coils has the further advantage that the pole elements therebetween may be made relatively thin. Since the thickness of the pole elements between the rotor magnet coils and brake magnet coils influences the thickness of the clutch walls or sections, the use of a substantial number of rotor magnet coils and brake magnet coils, with corresponding relatively thin pole elements therebetween, permits a substantial reduction in thickness of the clutch walls or sections. Thus, the clutch walls or sections may have a thickness not greater than the thickness of the rotor pole elements and brake pole elements, and a thickness which is approximately only one-half the thickness of the rotor pole elements and the brake pole elements. High clutching and braking power values are obtained in this invention by using a correspondingly high number of rotor magnet coils and brake magnet coils which seems to distribute the flux field over a substantial area of the clutch walls or sections.

The brake assembly is sturdily constructed and is provided with sufficient number of brake magnet coils to effect the braking action in a small interval of time, which may be a small fraction of a second. The brake assembly would normally be supported in stationary position within the stationary housing, and so formed that the brake magnet coils and the pole elements thereof are positioned directly adjacent that face of the clutch wall or section which is directly opposite the clutching face which is adjacent the rotor magnet coils and pole elements thereof. The gap between the brake magnet coils and associated pole elements and the adjacent face of the clutch wall or section, is such as to provide only a narrow gap in which the flowable magnetic material is contained.

It will be noted that in all forms of this invention, the rotor magnet coils and associated pole elements are arranged in staggered relation with respect to the brake magnet coils and associated pole elements. By this arrangement of the rotor magnet coils and brake magnet coils and their associated pole elements, the magnetic flux generated by the rotor magnet coils is confined to the adjacent clutch wall or section and does not enter the pole elements of the brake assembly when the rotor magnet coils are energized. Similarly, the magnetic lines of flux emanating from the energized brake magnet coils are confined to the clutch wall or section adjacent thereto, and do not enter the pole elements of the rotor assembly. This further feature permits the use of relatively thin clutch walls or sections which have a low moment of inertia.

Magnetic clutch and brake mechanisms made in accordance with this invention, include means for attaining effective circulation of the flowable magnetic material contained therein and in a manner to avoid packing or settling out of the iron particle components of the magnetic material and maintain the magnetic material free flowing. In the mechanism illustrated in Fig. 2, effective circulation of the magnetic material is effected by the provision of inclined impeller holes 46 at the bottom wall 44 of the drag cup assembly, bleeder holes 47 adjacent the bottom end of the cylindrical wall 45 of the drag cup assembly, and the pumping action exerted on the magnetic material driven through the pumping bores 9 of the rotor core 3 resulting from their lateral inclination from the bottom end of the core to the upper end thereof.

Agitative circulation of the magnetic material contained in the mechanism shown in Fig. 11 is attained by the provision of cooperating agitator pins 123 and 123' in the spacing gap a, by the provision of inclined impeller holes 124 in the inner disc section 103 of the rotor assembly 100, by the provision of cooperating agitator pins 125 and 125' in the gap space b which project from the hub section 117 of the clutch assembly 115 and the inner disc section 103 of the rotor assembly 100, by the provision of inclined impeller holes 126 in the inner disc section 103 of the rotor assembly, by the provision of cooperating agitator pins 109, 109' in the gap space c and projecting inwardly from the head section 147 of the cover housing 145 and from the outer disc section 104 of the rotor assembly 100. The cooperating pins 109 and 109' serve to drive the magnetic material from the gap space c into the gap d, and the opposite spiraling ribs 104' and 107' serve to drive the magnetic material through the gap d and inwardly along the opposite sides of the outer disc section 118 of the clutch assembly 115.

Similar inclined impeller holes and cooperating agitator pins may, if desired, be associated with the magnetic clutch and brake mechanism illustrated in Fig. 13. However, where relatively dry magnetic powder is used in the mechanism shown in Fig. 13, the dry magnetic powder can be substantially confined to the gap spaces on the opposite sides of the outer disc section 168 of the clutch assembly 165, by the action of the spiraling rib 153 presented by the outer rim face of the disc section 153 of the rotor assembly 150 in cooperation with the permanently magnetized toroidal magnet assembly 160 adjacent thereof; and by the spiral grooves 168' formed in the opposite faces of the clutch disc section 168 which serve to move the magnetic powder inwardly against the action of centrifugal force.

The rotor shaft and clutch shaft bearings of the mechanisms made in accordance with this invention are fully protected from entry of magnetic powder which would tend to abrade and damage the bearings, by the use of appropriately positioned toroidal magnet assemblies. For example, in the mechanism shown in Fig. 2, the bearing 23a which supports the rotor shaft 2 is protected by the toroidal magnet assembly 30, and the bearing assembly 54a which supports the clutch shaft 41 is protected by the toroidal magnet assembly 60 as previously described. In like manner, the toroidal magnet assembly 110 of the mechanism shown in Fig. 11 protects the bearing assembly 23a of its rotor shaft 101, and the permanent magnet assembly 120 protects the adjacent bearing assembly 54a which supports its clutch shaft 116. In the mechanism shown in Fig. 13, the toroidal magnet assembly 160 protects the adjacent bearing 23a which supports its rotor shaft 151, and the toroidal magnet assembly 120 protects the bearing 54a which supports its clutch shaft 166.

The magnetic clutch and brake mechanisms of this invention are all compactly contained in encasing housing comprising a main housing and a cover housing, which can be assembled together with the brake, clutch and rotor assemblies positioned therein. The rotor, clutch and brake assemblies of these mechanisms are of relatively simple construction embracing a minimum number of relatively simple components, which facilitates fabrication and assembly thereof, to provide brake and clutch mechanisms of minimum over-all dimensions in accordance with power input and output requirements.

While certain novel features of this invention have been disclosed herein and are pointed out in the claims, it will be understood that various omissions, substitutions, and changes may be made by those skilled in the art without departing from the spirit of this invention.

What is claimed is:

1. A highly compact magnetic clutch and brake mechanism of limited over-all dimension whose clutching and braking actions can be effected in minimum time and which comprises; a rotor assembly adapted to be externally driven and having a circular rotor member, a pair of pole forming elements presented by said rotor member and a magnet coil sandwiched between said pole forming elements; a clutch assembly of low moment of inertia designed to be driven by said rotor assembly and having a circular driven member presenting a relatively thin clutch section having one face thereof directly adjacent the magnet coil and pole elements of said rotor assembly to provide a narrow gap between the adjacent surfaces of said clutch section and rotor pole elements for containing flowable magnetic gap bridging material; a brake assembly including a relatively stationary circular member, a pair of pole forming elements presented by one side of said circular member and a brake magnet coil sandwiched between said pole forming elements, said brake coil and associated pole elements being positioned directly adjacent the opposite face of the clutch section of said clutch assembly to provide a relatively narrow gap therebetween for the reception of flowable magnetic bridging material; and a control circuit operative to selectively energize said rotor coil and braking coil.

2. A highly compact magnetic clutch and brake mechanism of limited over-all dimension whose clutching and braking actions can be effected in minimum time and which comprises; an externally driven rotor assembly having a circular rotor member, a plurality of spaced and alternately wound magnet coils set within said rotor member and pole forming elements sandwiched between said rotor magnet coils; a clutch assembly of low moment of inertia designed to be driven by said rotor assembly and having a circular driven member presenting a relatively thin clutch section having one face thereof directly adjacent the magnet coils and pole elements of said rotor assembly to provide a narrow gap between the adjacent surfaces of said clutch section and rotor pole elements for containing flowable magnetic gap bridging material; a brake assembly having a relatively stationary circular member presenting a plurality of spaced and alternately wound magnet coils and pole forming elements separating said brake magnet coils, said brake coils and associated pole elements being positioned directly adjacent the opposite face of the clutch section of said clutch assembly to provide a relatively narrow gap therebetween for the reception of flowable magnetic bridging material; and a control circuit operative to selectively energize said rotor coils and braking coils.

3. A highly compact magnetic clutch and brake mechanism of limited over-all dimension whose clutching and braking actions can be effected in minimum time and which comprises; an externally driven rotor assembly having a circular rotor member, a plurality of spaced and alternately wound magnet coils set within said rotor member and pole forming elements separating said rotor magnet coils; a clutch assembly of low moment of inertia designed to be driven by said rotor assembly and having a circular driven member presenting a relatively thin clutch section having one face thereof directly adjacent the magnet coils and pole elements of said rotor assembly to provide a narrow gap between the adjacent surfaces of said clutch section and rotor pole elements for containing flowable magnetic gap bridging material; a brake assembly having a circular member presenting a plurality of spaced and alternately wound magnet coils and pole forming elements separating said brake magnet coils, said brake coils and associated pole elements being positioned directly adjacent the opposite face of the clutch section of said clutch assembly to provide a relatively narrow gap therebetween for the reception of flowable magnetic bridging material; and a control circuit operative to selectively energize said rotor coils and braking coils; the clutch section of said clutch assembly having an average thickness which is not more than the thickness of the pole elements sandwiched between the rotor magnet coils, nor less than one-half the thickness of the pole elements sandwiched between the rotor magnet coils.

4. A highly compact magnetic clutch and brake mechanism of limited over-all dimension whose clutching and braking actions can be effected in minimum time and which comprises; an externally driven rotor assembly having a circular rotor member, a plurality of spaced and alternately wound magnet coils set with said rotor member and pole forming elements positioned between said rotor magnet coils; a clutch assembly of low moment of inertia designed to be driven by said rotor assembly and having a circular driven member presenting a relatively thin clutch section having one face thereof directly adjacent the magnet coils and pole elements of said rotor assembly to provide a narrow gap between the adjacent surfaces of said clutch section and rotor pole elements for containing flowable magnetic gap bridging material; a brake assembly having a circular member presenting a plurality of spaced and alternately wound magnet coils and pole forming elements separating said brake magnet coils, said brake coils and associated pole elements being positioned directly adjacent the opposite face of the clutch section of said clutch assembly to provide a relatively narrow gap therebetween for the reception of flowable magnetic bridging material; and a control circuit operative to selectively energize said rotor coils and braking coils; the clutch section of said clutch assembly having an average thickness which is not more than the thickness of the pole elements between the rotor magnet coils and the brake magnet coils, nor less than one-half the thickness of the pole elements between the rotor magnet coils and the brake magnet coils.

5. A highly compact magnetic clutch and brake mechanism of limited over-all dimension whose clutching and braking actions can be effected in minimum time and which comprises: an externally driven rotor assembly having a circular rotor member, a plurality of spaced and alternately wound magnet coils set into said rotor member and pole forming elements separating said rotor magnet coils; a clutch assembly of low moment of inertia designed to be driven by said rotor assembly and having a circular driven member presenting a relatively thin clutch section having one face thereof directly adjacent the magnet coils and pole elements of said rotor assembly to provide a narrow gap between the adjacent surfaces of said clutch section and rotor pole elements for containing flowable magnetic gap bridging material; a brake assembly having a relatively stationary circular member presenting a plurality of spaced and alternately wound magnet coils and pole forming elements separating said brake magnet coils, said brake coils and associated pole elements being positioned directly adjacent the opposite face of the clutch section of said clutch assembly to provide a relatively narrow gap therebetween for the reception of flowable magnetic bridging material; and a control circuit operative to selectively energize said rotor coils and braking coils; said rotor magnet coils and adjacent pole forming elements thereof being arranged in staggered relation with respect to the brake magnet coils and adjacent pole forming elements thereof.

6. A highly compact magnetic clutch and brake mechanism of limited over-all dimension whose clutching and braking actions can be effected in minimum time and which comprises; an externally driven rotor assembly having a circular rotor member, a plurality of spaced and alternately wound magnet coils set into said rotor member and pole forming elements positioned between said rotor magnet coils; a clutch assembly of low moment of inertia designed to be driven by said rotor assembly and having a circular driven member presenting a relatively thin clutch section having one face thereof directly adjacent the magnet coils and pole elements of said rotor assembly to provide a narrow gap between the adjacent surfaces of said clutch section and rotor pole elements for containing flowable magnetic gap bridging material; a brake assembly having a relatively stationary circular member presenting a plurality of spaced and alternately wound magnet coils and pole forming elements separating said brake magnet coils, said brake coils and associated pole elements being positioned directly adjacent the opposite face of the clutch section of said clutch assembly to provide a relatively narrow gap therebetween for the reception of flowable magnetic bridging material; and a control circuit operative to selectively energize said rotor coils and braking coils; said rotor magnet coils and adjacent pole forming elements thereof being arranged in staggered relation with respect to the brake magnet coils and adjacent pole forming elements thereof; the intervening clutch section of said clutch assembly having an average thickness which is not more than the thickness of the pole elements between the rotor magnet coils and the brake magnet coils, nor less than one-half the thickness of the pole elements between the rotor magnet coils and brake magnet coils.

7. A highly compact magnetic clutch and brake mechanism of limited over-all dimension whose clutching and braking actions can be effected in a fraction of a second and which comprises; an externally driven rotor assembly having a cylindrical rotor core, a rotor magnet coil set into the cylindrical surface of said core and presenting adjacent pole forming elements; a clutch assembly of low moment of inertia designed to be driven by said rotor assembly and including a drag cup presenting a bottom wall and a relatively thin cylindrical wall having the inner face thereof directly adjacent the rotor magnet coil and adjacent pole elements thereof to provide a narrow gap therebetween for containing magnetic gap bridging material; a brake assembly presenting a cylindrical member supporting a magnet coil and associated pole forming elements, said brake coil and associated pole elements being positioned directly adjacent the outside face of the cylindrical body wall of the clutch assembly to provide a relatively narrow gap therebetween for the reception of flowable magnetic bridging material; and a control circuit operative to selectively energize said rotor coils and braking coils.

8. A highly compact magnetic clutch and brake mechanism of limited over-all dimension whose clutching and braking actions can be effected in a fraction of a second and which comprises; an externally driven rotor assembly having a cylindrical rotor core, a plurality of spaced and alternately wound magnet coils set into the exterior cylindrical surface of said core and presenting pole forming elements therebetween; a clutch assembly of low moment of inertia designed to be driven by said rotor assembly and including a drag cup presenting a relatively thin cylindrical wall having the inner face thereof directly adjacent the rotor magnet coils and adjacent pole elements thereof to provide a narrow gap therebetween for containing magnetic gap bridging material; a brake assembly presenting an exterior cylindrical member supporting a plurality of spaced and alternately wound magnet coils and pole forming elements separating said brake magnet coils, said brake coils and associated pole elements being positioned directly adjacent the outside face of the cylindrical body wall of the clutch assembly to provide a relatively narrow gap therebetween for the reception of flowable magnetic bridging material; and a control circuit operative to selectively energize said rotor coils and braking coils.

9. A highly compact magnetic clutch and brake mechanism of limited over-all dimension whose clutching and braking actions can be effected in a fraction of a second and which comprises; an externally driven rotor assembly having a cylindrical rotor core, a plurality of spaced and alternately wound magnet coils set into the exterior cylindrical surface of said core and presenting pole forming elements therebetween; a clutch assembly of low moment of inertia designed to be driven by said rotor assembly and including a drag cup presenting a relatively thin cylindrical wall having the inner face thereof directly adjacent the rotor magnet coils and adjacent pole elements thereof to provide a narrow gap therebetween for containing magnetic gap bridging material; a brake assembly presenting an exterior cylindrical member supporting a plurality of spaced and alternately wound magnet coils and pole forming elements separating said brake magnet coils, said brake coils and associated pole elements being positioned directly adjacent the outside face of the cylindrical body wall of the clutch assembly to provide a relatively narrow gap therebetween for the reception of a flowable magnetic bridging material; and a control circuit operative to selectively energize said rotor coils and braking coils; said rotor magnet coils and adjacent pole forming elements being arranged in staggered relation with respect to the brake magnet coils and pole forming elements thereof; the cylindrical wall of said clutch assembly having an average thickness which is not more than the thickness of the pole elements between the rotor magnet coils and the brake magnet coils, nor less than one-half the thickness of the pole elements between the rotor magnet coils and the brake magnet coils.

10. A highly compact magnetic clutch and brake mechanism of limited over-all dimension whose clutching and braking actions can be effected in a fraction of a second and which comprises; an externally driven rotor assembly having a cylindrical rotor core, a plurality of spaced and alternately wound magnet coils set into the exterior cylindrical surface of said core and presenting pole forming elements therebetween; a clutch assembly of low moment of inertia designed to be driven by said rotor assembly and including a drag cup presenting a bottom wall and a relatively thin cylindrical wall having the inner face thereof directly adjacent the rotor magnet coils and adjacent pole elements thereof to provide a narrow gap therebetween for containing magnetic gap bridging material; a brake assembly presenting an exterior cylindrical member supporting a plurality of spaced and alternately wound magnet coils and pole forming elements separating said brake magnet coils, said brake coils and associated pole elements being positioned directly adjacent the outside face of the cylindrical body wall of the clutch assembly to provide a relatively narrow gap therebetween for the reception of flowable magnetic bridging material; a control circuit operative to selectively energize said rotor coils and braking coils; and means for circulating the flowable magnetic material within the mechanism including a series of inclined impeller holes in the bottom wall of the clutch drag cup and a series of axial pumping passages extending through said rotor core and inclined towards the free end of said clutch drag cup.

11. A highly compact magnetic clutch and brake mechanism of limited over-all dimension whose clutching and braking actions can be effected in a fraction of a second and which comprises; an externally driven rotor assembly having a shaft designed to be externally driven, a cylindrical rotor core secured thereto, a plurality of spaced and alternately wound magnet coils set into the exterior cylindrical surface of said core and presenting pole forming elements therebetween; a clutch assembly of low moment of inertia designed to be driven by said rotor assembly and including a power delivery shaft, a drag cup fixed to said shaft and presenting a relatively thin cylindrical wall having the inner face thereof directly adjacent the rotor magnet coils and adjacent pole elements thereof to provide a narrow gap therebetween for containing magnetic gap bridging material; a brake assembly presenting an exterior cylindrical member supporting a plurality of spaced and alternately wound magnet coils and pole forming elements separating said brake magnet coils, said brake coils and associated pole elements being positioned directly adjacent the outside face of the cylindrical body wall of the clutch assembly to provide a relatively narrow gap therebetween for the reception of flowable magnetic bridging material; a control circuit operative to selectively energize said rotor coils and braking coils; a housing enclosing said rotor core, clutch drag cup, brake assembly and adjacent sections of said rotor shaft and clutch shaft; a rotor shaft bearing supported in said housing; a permanent magnet assembly of toroidal form supported within said housing between said rotor bearing and rotor core and in surrounding relation to the rotor shaft and operative to exclude magnetic particles from the vicinity of said rotor shaft bearing; a second permanent magnet of toroidal form supported by said housing in surrounding relation to said clutch shaft and positioned between the clutch drag cup and clutch shaft bearing and operative to exclude magnetic particles from the vicinity of said clutch shaft bearing.

12. A highly compact magnetic clutch and brake mechanism of limited over-all dimension whose clutching and braking actions can be effected in limited time and which comprises; an externally driven rotor assembly having a generally cylindrical rotor core, a magnet coil of circular form set into the underface of said core, said magnet coil being positioned between adjacent pole forming elements; a clutch assembly of low moment of inertia designed to be driven by said rotor assembly and including a circular drag disc having a relatively thin outer disc section presenting relatively flat opposite side faces with one of said faces positioned directly adjacent the magnet coil and pole elements of said rotor assembly to define a narrow gap therebetween for containing magnetic gap bridging material; a brake assembly including a generally cylindrical member supporting a wound magnet coil of circular form supported by said cylindrical member, said magnet coil being positioned between adjacent pole forming elements said magnet coil and pole forming elements being positioned directly adjacent the opposite face of the outer disc section of said clutch assembly to thereby define a relatively narrow gap therebetween for the reception of flowable magnetic gap bridging material; and a control circuit operative to selectively energize said rotor coils and braking coils.

13. A highly compact magnetic clutch and brake mechanism of limited over-all dimension whose clutching and braking actions can be effected in limited time and which comprises; an externally driven rotor assembly having a generally cylindrical rotor core, a plurality of concentrically spaced and alternately wound magnet coils of circular form set into the underface of said core and presenting pole forming elements therebetween; a clutch assembly of low moment of inertia designed to be driven by said rotor assembly and including a circular drag disc having a relatively thin outer disc section presenting relatively flat opposite side faces with one of said faces positioned directly adjacent the magnet coils and pole elements of said rotor assembly to provide a narrow gap therebetween for containing magnetic gap bridging material; a brake assembly including a generally cylindrical member, a plurality of concentrically spaced and alternately wound brake magnet coils of circular form set into a side face of said member, and pole forming elements positioned between said brake magnet coils, said brake magnet coil and associated pole elements being positioned directly adjacent the opposite face of the outer disc section of said clutch assembly to thereby define a relatively narrow gap therebetween for the reception of flowable magnetic gap bridging material; and a control circuit operative to selectively energize said rotor coils and braking coils.

14. A highly compact magnetic clutch and brake mechanism of limited over-all dimension whose clutching and braking actions can be effected in limited time and which comprises; an externally driven rotor assembly having a generally cylindrical rotor core, a plurality of concentrically spaced and alternately wound magnet coils of circular form set into the underface of said core and presenting pole forming elements therebetween; a clutch assembly of low moment of inertia designed to be driven by said rotor assembly and including a circular drag disc having a relatively thin outer disc section presenting relatively flat opposite side faces with one of said faces positioned directly adjacent the magnet coils and pole elements of said rotor assembly to provide a narrow gap therebetween for containing magnetic gap bridging material; a brake assembly including a generally cylindrical member, a plurality of concentrically spaced and alternately wound brake magnet coils of circular form set into a side face of said member, and pole forming elements positioned between said brake magnet coils; said brake magnet coils and associated pole elements being positioned directly adjacent the opposite face of the outer disc section of said clutch assembly to thereby define a relatively narrow gap therebetween for the reception of flowable magnetic gap bridging material; a control circuit operative to selectively energize said rotor coils and braking coils; said rotor magnet coils and adjacent pole forming elements being arranged in staggered relation with respect to the brake magnet coils and pole forming elements thereof; the outer disc section of said clutch assembly having an average thickness which is not more than the average thickness nor less than one-half the average thickness of the pole elements sandwiched between the rotor magnet coils and brake magnet coils.

15. A highly compact magnetic clutch and brake mechanism of limited over-all dimension whose clutching and braking actions can be effective in limited time and which comprises; an externally driven rotor assembly having a generally cylindrical rotor core, a plurality of concentrically spaced and alternately wound magnet coils of circular form set into the underface of said core and presenting pole forming elements therebetween; a clutch assembly of low moment of inertia designed to be driven by said rotor assembly and including a circular drag disc having a relatively thin outer disc section presenting relatively flat opposite side faces with one of said faces positioned directly adjacent the magnet coils and pole elements of said rotor assembly to provide a narrow gap therebetween for containing magnetic gap bridging material; a brake assembly including a generally cylindrical member, a plurality of concentrically spaced and alternately wound brake magnet coils of circular form set into a side face of said member, and pole forming elements separating said brake magnet coils, said brake magnet coils and associated pole forming elements being positioned directly adjacent the opposite face of the outer disc section of said clutch assembly to thereby define a relatively narrow gap therebetween for the reception of flowable magnetic gap bridging material; a control circuit operative to selectively energize said rotor coils and braking coils; a housing enclosing said rotor core, clutch drag disc, brake assembly and adjacent sections of said rotor shaft and clutch shaft; a rotor shaft bearing supported in said housing; a clutch shaft bearing supported in said housing; means for excluding magnetic particles from the vicinity of said rotor shaft bearing including a permanent magnet assembly of toroidal form supported in said housing between said rotor bearing and rotor core and in surrounding relation to the rotor shaft, and a surface of magnetic material supported by said rotor core and having an outwardly spiraling rib positioned adjacent to a side face of said permanent magnet and operative to eject magnetic particles entering the gap therebetween when said rotor assembly is rotated; and means for excluding magnetic particles from said clutch shaft bearing including a permanent magnet assembly of toroidal form supported in said housing between said clutch shaft bearing and drag disc, said drag disc presenting a surface of magnetic material having an outwardly spiraling rib positioned adjacent a side face of said last named permanent magnet and operative to exclude magnetic particles entering the gap between the said last named rib and permanent magnet.

16. A highly compact magnetic clutch and brake mechanism of limited over-all dimension whose clutching and braking actions can be effected in limited time and which comprises; an externally driven rotor assembly having a generally cylindrical rotor core presenting an inner disc section and a thicker outer rim section; a plurality of concentrically spaced and alternately wound magnet coils of circular form set into the underface of the outer rim section of said core, and pole forming elements sandwiched between said magnet coils; a clutch assembly of low moment of inertia designed to be driven by said rotor assembly and including a circular drag disc having a relatively thin outer disc section presenting relatively flat opposite side faces with one of said faces positioned directly adjacent the magnet coils and pole elements of said rotor assembly to provide a narrow gap therebetween for containing magnetic gap bridging material; a brake assembly including a generally cylindrical member, a plurality of concentrically spaced and alternately wound brake magnet coils of circular form set into a side face of said member, and pole forming elements positioned between said brake magnet coils, said brake magnet coils and associated pole elements being positioned directly adjacent the opposite face of the outer disc section of said clutch assembly to thereby define a relatively narrow gap therebetween for the reception of flowable magnetic gap bridging material; a control circuit operative to selectively energize said rotor coils and braking coils; a housing enclosing said rotor core, clutch drag disc and brake assembly; and means for circulating flowable magnetic material through the gaps adjacent the opposite side faces of the outer disc section of said clutch assembly including, inclined impeller holes extending through said clutch drag disc and the inner disc section of said rotor assembly, cooperating agitator pins fixed to the inner disc section of said rotor assembly and the inner section of the drag disc and extending into the cavity therebetween, and oppositely spiraling ribs extending along the outer rim face of said rotor core and the adjacent inner face of said enclosing housing, said oppositely spiraling ribs being operative to drive flowable magnetic material into the gaps adjacent the opposite side faces of said clutch drag disc.

17. A highly compact magnetic clutch and brake mechanism of limited over-all dimension whose clutching and braking actions can be effected in limited time and which comprises; an externally driven motor assembly having a generally cylindrical rotor core, a plurality of concentrically spaced and alternately wound magnet coils of circular form set into the underface of said core and presenting pole forming elements therebetween; a clutch assembly of low moment of inertia designed to be driven by said rotor assembly and including a circular drag disc having a relatively thin outer disc section presenting relatively flat opposite side faces with one of said faces positioned directly adjacent the magnet coils and pole elements of said rotor assembly to provide a narrow gap therebetween for containing magnetic gap bridging material; a brake assembly including a generally cylindrical member supporting a plurality of concentrically spaced and alternately wound magnet coils of circular form set into a side face thereof and pole forming elements separating said brake magnet coils, said brake coils and associated pole forming elements being positioned directly adjacent the opposite face of the outer disc section of said clutch assembly to thereby define a relatively narrow gap therebetween for the reception of flowable magnetic gap bridging material; a control circuit operative to selectively energize said rotor coils and braking coils; a housing enclosing said rotor core, clutch drag disc, brake assembly and adjacent sections of said rotor shaft and clutch shaft; a rotor shaft bearing supported in said housing; a clutch shaft bearing supported in said housing; means for excluding magnetic particles from the vicinity of said rotor shaft bearing including a permanent magnet assembly of toroidal form supported in said housing adjacent the rim face of said rotor core, the rim face of said rotor core having a surface of magnetic material presenting a spiraling rib positioned adjacent to a side face of said permanent magnet and operative to eject magnetic particles entering the gap therebetween when said rotor assembly is rotated; and means for excluding magnetic particles from said clutch shaft bearing including a permanent magnet assembly of toroidal form supported in said housing between said clutch shaft bearing and drag disc, said drag disc presenting a surface of magnetic material having an outwardly spiraling rib positioned adjacent a side face of said last named permanent magnet and operative to exclude magnetic particles entering the gap between said last named rib and permanent magnet.

18. A highly compact magnetic clutch and brake mechanism of limited over-all dimension whose clutching and braking actions can be effected in limited time and which comprises; an externally driven rotor assembly having a generally cylindrical rotor core, a plurality of concentrically spaced and alternately wound magnet coils of circular form set into the underface of said core and presenting pole forming elements therebetween; a clutch assembly of low moment of inertia designed to be driven by said rotor assembly and including a circular drag disc having relatively flat opposite side faces with one of said faces positioned directly adjacent the magnet coils and pole elements of said rotor assembly to provide a narrow gap therebetween for containing magnetic gap bridging material; a brake assembly including a generally cylindrical member composed of a series of concentrically spaced pole elements positioned directly adacent the opposite face of the outer disc section of said clutch assembly, a series of permanent magnets sandwiched between said brake pole elements and positioned in spaced relation to said clutch disc section, and a corresponding series of brake magnet coils also sandwiched between said brake pole elements and positioned in adjacent relation to said clutch disc section, said permanent brake magnets being operative to normally establish a field of magnetic flux in the outer disc section of said clutch assembly to thereby lock said clutch assembly in stationary position, said brake magnet coils when energized being operative to neutralize the magnetic flux established in said outer clutch disc section by said permanent brake magnets to thereby permit said rotor assembly to drive said clutch assembly; and a control circuit operative to selectively energize said rotor magnet coils and brake magnet coils substantially simultaneously.

19. A magnetic clutch and brake mechanism including in combination; an externally driven rotor assembly having a generally cylindrical rotor core, a plurality of concentrically spaced and alternately wound magnet coils of circular form set into the underface of said core and presenting pole forming elements therebetween; a clutch assembly of low moment of inertia designed to be driven by said rotor assembly and including a circular drag disc having relatively flat opposite side faces with one of said faces positioned directly adjacent the magnet coils and pole elements of said rotor assembly to provide a narrow gap therebetween for containing magnetic gap bridging material; a brake assembly including a generally cylindrical member composed of a series of concentrically spaced pole elements with brake magnet coils sandwiched therebetween, said brake pole elements and brake magnet coils being positioned directly adjacent the opposite face of the drag disc of said clutch assembly to thereby define a narrow gap therebetween for containing magnetic gap bridging material; a control circuit operative to selectively energize said rotor magnet coils and brake magnet coils; and means for maintaining flowable magnetic material in the gaps defined between the opposite faces of said clutch drag disc and the adjacent rotor magnet coils and associated pole elements and the opposite brake magnet coils and associated pole elements, said means including an inwardly spiraling rib presented by each of the opposite faces of said clutch drag disc, said ribs being operative to maintain the magnetic material within the gaps adjacent the opposite side faces of said clutch drag disc in opposition to the centrifugal forces exerted on the magnetic material in said gaps as produced by rotation of said rotor core and clutch drag disc.

20. A magnetic clutch and brake mechanism including in combination; an externally driven rotor assembly having a generally cylindrical rotor core, a plurality of concentrically spaced and alternately wound magnet coils of circular form set into the underface of said core and presenting pole forming elements therebetween; a clutch assembly of low moment of inertia designed to be driven by said rotor assembly and including a circular drag disc having relatively flat opposite side faces with one of said faces positioned directly adjacent the magnet coils and pole elements of said rotor assembly to provide a narrow gap therebetween for containing the magnetic gap bridging materials; a brake assembly including a generally cylindrical member composed of a series of concentrically spaced pole elements and brake magnet coils sandwiched between said brake pole elements, said brake pole elements and brake magnet coils being positioned directly adjacent the opposite face of the drag disc of said clutch assembly to thereby define a narrow gap therebetween for containing magnetic gap bridging material; a control circuit operative to selectively energize said rotor magnet coils and brake magnet coils; a housing presenting a cylindrical body section enclosing the outer peripheries of said rotor core, clutch drag disc and brake assembly; and means for maintaining flowable magnetic material in the gaps defined between the opposite faces of said clutch drag disc and the adjacent rotor magnet coils and associated pole elements and the opposite brake magnet coils and associated pole elements, said means including an inwardly spiraling rib presented by each of the opposite faces of said clutch drag disc, said ribs being operative to maintain the magnetic material within the gaps adjacent the opposite side faces of said clutch drag disc in opposition to the centrifugal forces exerted on the magnetic material in said gaps as produced by rotation of said rotor core and clutch drag disc, and a spiraling rib formed on the outer periphery of the rotor core operative to move magnetic material entering the gap between said rotor rib and the adjacent inner face of the tubular body section of the housing into the gaps adjacent the opposite side faces of the clutch drag disc.

References Cited in the file of this patent

UNITED STATES PATENTS

| | | |
|---|---|---|
| 2,544,360 | Schmidt | Mar. 6, 1951 |
| 2,573,065 | Salemme | Oct. 30, 1951 |
| 2,575,360 | Rabinow | Nov. 20, 1951 |
| 2,612,248 | Feiertag | Sept. 30, 1952 |
| 2,622,713 | Rabinow | Dec. 23, 1952 |
| 2,791,308 | Barrett et al. | May 7, 1957 |
| 2,794,525 | Winther | June 4, 1957 |
| 2,813,605 | Buslik et al. | Nov. 19, 1957 |
| 2,832,449 | Winther | Apr. 29, 1958 |